US011704787B2

(12) United States Patent
Dwivedi et al.

(10) Patent No.: US 11,704,787 B2
(45) Date of Patent: Jul. 18, 2023

(54) METHOD AND SYSTEM FOR DETERMINING STOCK IN AN INVENTORY

(71) Applicant: Wipro Limited, Bangalore (IN)

(72) Inventors: Gyanesh Dwivedi, Bangalore (IN); Vijay Singh, Bangalore (IN); Anandaraj Thangappan, Bangalore (IN)

(73) Assignee: Wipro Limited, Bangalore (IN)

( * ) Notice: Subject to any disclaimer, the term of this patent is extended or adjusted under 35 U.S.C. 154(b) by 264 days.

(21) Appl. No.: 17/142,398

(22) Filed: Jan. 6, 2021

(65) Prior Publication Data

US 2022/0148156 A1 May 12, 2022

(30) Foreign Application Priority Data

Nov. 6, 2020 (IN) .............................. 202041048630

(51) Int. Cl.
*G06T 7/00* (2017.01)
*G06Q 10/087* (2023.01)
*G06K 19/06* (2006.01)
*G06T 7/50* (2017.01)
(Continued)

(52) U.S. Cl.
CPC ...... *G06T 7/0008* (2013.01); *G06K 19/06037* (2013.01); *G06Q 10/087* (2013.01); *G06T 7/001* (2013.01); *G06T 7/11* (2017.01); *G06T 7/50* (2017.01); *G06T 7/73* (2017.01)

(58) Field of Classification Search
CPC ............. G06K 19/06; G06K 19/06009; G06K 19/06037; G06Q 10/08; G06Q 10/087; G06T 7/0002; G06T 7/0004; G06T 7/0008; G06T 7/001; G06T 7/11; G06T 7/50; G06T 7/73; G06T 7/74; G06T 7/77; G06T 2207/20076; G06T 2207/20064; G06T 2207/30168; G06T 2207/30204; G06T 2207/20081
See application file for complete search history.

(56) References Cited

U.S. PATENT DOCUMENTS 9,569,851 B2 2/2017 Pavani et al.
10,664,971 B2 * 5/2020 Mohiuddin Khan ..... G06T 7/13
10,984,378 B1 * 4/2021 Eckman ........... G06K 19/06131
(Continued)

FOREIGN PATENT DOCUMENTS

WO WO-2019241420 A1 * 12/2019 ............. G16H 10/65

*Primary Examiner* — Sumati Lefkowitz
*Assistant Examiner* — Niranjini Chintalapoodi
(74) *Attorney, Agent, or Firm* — Finnegan, Henderson, Farabow, Garrett & Dunner, LLP

(57) ABSTRACT

The present invention relates to a method of determining stock in an inventory. The method comprises obtaining one or more images comprising one or more objects. Further, estimating a three dimensional (3D) location of a Stock Keeping Unit (SKU) marker associated with each of one or more visible objects. Furthermore, determining a stacking pattern of the one or more objects for each level on the pallet using one of the 3D location of SKU marker and a learning model. Thereafter, detecting at least one of presence or absence of one or more undetected objects at each level based on the stacking pattern and the 3D location of the SKU marker. Finally, determining the stock in the inventory based on the presence or the absence of the one or more undetected objects and the one or more visible objects.

17 Claims, 14 Drawing Sheets

(51) Int. Cl.
*G06T 7/11* (2017.01)
*G06T 7/73* (2017.01)

(56) References Cited

U.S. PATENT DOCUMENTS

| | | | |
|---|---|---|---|
| 2009/0309979 A1* | 12/2009 | Yang | G06V 10/457 348/206 |
| 2010/0017407 A1 | 1/2010 | Beniyama et al. | |
| 2016/0171707 A1* | 6/2016 | Schwartz | G06V 20/52 382/180 |
| 2018/0005176 A1 | 1/2018 | Williams et al. | |

* cited by examiner

| Identification Value (403) | Dimension (405) | Stacking pattern (406) |
|---|---|---|
| AE-TB-W7-34 | 34x 87.5x 12 | Pattern – 3 for levels 1,3,5<br>Pattern – 1 for levels 2,4,6 |
| XH-QM-3-92 | 122x 81x 54 | Pattern – 4 for levels 1,3,5<br>Pattern – 2 for levels 2,4,6 |
| ... | ... | ... |
| JG-789-FI-NL | 63x 63x 29 | Pattern – 7 for levels 1,3,5<br>Pattern – 3 for levels 2,4,6 |

METHOD AND SYSTEM FOR DETERMINING STOCK IN AN INVENTORY

TECHNICAL FIELD

The present disclosure relates to the field of warehouse or inventory management. Particularly, but not exclusively, the present disclosure relates to a method for determining stock in an inventory.

BACKGROUND

Generally, inventory management plays an important role in Enterprise Resource Planning. An enterprise may include one or more warehouses or inventories for storing stocks, which may be located at different geographical locations. Therefore, stocktaking or stock accounting from the one or more warehouses is a challenging task for the enterprise. The stocktaking involves determining an amount of stock present in the one or more warehouses. Further, the activity of stocktaking is performed periodically in the one or more warehouses. The stocktaking helps the enterprise meet the requirements and demands of consumers, identify stocks nearing expiry, create new offers to increase the sales, identify shortage of the stock to procure new stock, identify discrepancies in a product inventory and the like. The stocktaking was traditionally performed manually which is labor-intensive process and time consuming activity. In recent times, automated stocktaking techniques use images of the stocks in the inventory to determine the stock. Further, the automated stocktaking techniques are prone to errors caused due to damaged stocks, undetected stocks, obstacles in line of sight of camera and the like.

Therefore, there is a need for an efficient technique to perform stocktaking with reduced labor-intensive activities. Further, there is a need for determining the stocks in a lesser time compared to physical stocktaking while determining quantity of the stocks without errors.

The information disclosed in this background of the disclosure section is only for enhancement of understanding of the general background of the invention and should not be taken as an acknowledgement or any form of suggestion that this information forms the prior art already known to a person skilled in the art.

SUMMARY

Other embodiments and aspects of the disclosure are described in detail herein and are considered a part of the claimed disclosure.

Disclosed herein is a computing system for determining stock in an inventory, the computing system comprises at least one processor and a memory, wherein the memory is communicatively coupled to the at least one processor. The memory stores the at least one processor instructions, which, on execution, causes the at least one processor to obtain one or more images comprising one or more objects stored on a pallet in the inventory. Further, the instructions causes the at least one processor to estimate a three dimensional (3D) location of a Stock Keeping Unit (SKU) marker associated with each of one or more visible objects from the one or more objects in the one or more images, where the 3D location of the SKU marker is indicative of the 3D location of the associated visible object with respect to the pallet. Furthermore, the instructions causes the at least one processor to determine a stacking pattern of the one or more objects for each level from one or more levels of stacking on the pallet using one of, the 3D location of SKU marker and a learning model. Thereafter, the instructions causes the at least one processor to detect at least one of, a presence or an absence of one or more undetected objects at each level based on the stacking pattern and the 3D location of the SKU marker associated with each of one or more visible objects at the each level of stacking. Finally, the instructions causes the at least one processor to determine the stock in the inventory based on the presence or the absence of the one or more undetected objects and the one or more visible objects from the one or more images.

Embodiments of the present disclosure discloses a method of determining stock in an inventory. The method comprises obtaining one or more images comprising one or more objects stored on a pallet in the inventory. Further, the method comprises estimating a three dimensional (3D) location of a Stock Keeping Unit (SKU) marker associated with each of one or more visible objects from the one or more objects in the one or more images, wherein the 3D location of the SKU marker is indicative of the 3D location of the associated visible object with respect to the pallet. Furthermore, the method comprises determining a stacking pattern of the one or more objects for each level from one or more levels of stacking on the pallet using one of the 3D location of SKU marker and a learning model. Thereafter, the method comprises detecting at least one of a presence or an absence of one or more undetected objects at each level based on the stacking pattern and the 3D location of the SKU marker associated with each of one or more visible objects at the each level of stacking. Finally, the method comprises determining the stock in the inventory based on the presence or the absence of one or more undetected objects and the one or more visible objects from the one or more images.

Embodiments of the present disclosure discloses a non-transitory computer readable medium including instructions stored thereon that when processed by at least one processor cause a device to perform operations comprising obtaining one or more images comprising one or more objects stored on a pallet in the inventory. Further, estimating a three dimensional (3D) location of a Stock Keeping Unit (SKU) marker associated with each of one or more visible objects from the one or more objects in the one or more images, wherein the 3D location of the SKU marker is indicative of the 3D location of the associated visible object with respect to the pallet. Furthermore, determining a stacking pattern of the one or more objects for each level from one or more levels of stacking on the pallet using one of the 3D location of SKU marker and a learning model. Thereafter, detecting at least one of a presence or an absence of one or more undetected objects at each level based on the stacking pattern and the 3D location of the SKU marker associated with each of one or more visible objects at the each level of stacking. Finally, determining the stock in the inventory based on the presence or the absence of one or more undetected objects and the one or more visible objects from the one or more images.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
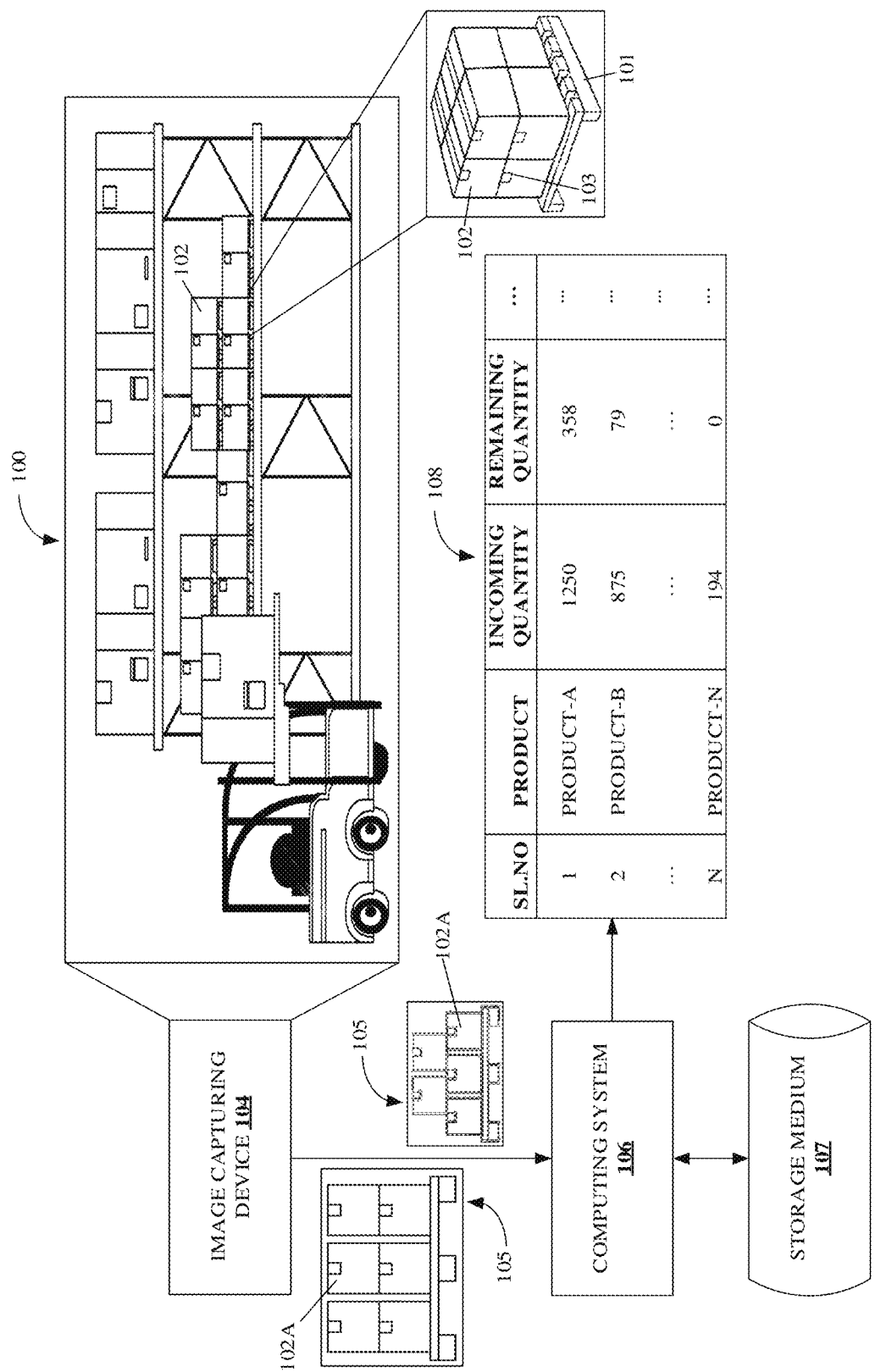
FIG. 1 shows an exemplary environment for determining stock in an inventory, in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for determining stock in an inventory, in accordance with some embodiments of the present disclosure.

In an embodiment, an inventory (100) may be used to store a plurality of products. The inventory (100) may include at least one of a warehouse, a stock room, wholesale and retail outlets, grocery stores and the like. The plurality of products, for example, may include groceries, medicines, food products, apparels, toys, and the like. The plurality of products mentioned herein should not be considered as a limitation, rather indicates the different types of products that may be stored in the inventory (100). In one embodiment, the plurality of products may be stored inside a box or a container on a pallet (101). In another embodiment, the plurality of products may be stored directly on the pallet (101). Further, the plurality of products stored directly on the pallet (101) and the box or a container stored on the pallet (101) are referred to as one or more objects (102) in the disclosure herein. The one omore objects (102) may be stored on the pallet (101) at one or more levels of stacking. For example, the plurality of products may be stacked vertically one above the other and horizontally one behind the other as shown in FIG. 1. The plurality of products may be stored or arranged in different patterns. In an embodiment, the pattern in which the plurality of products are stacked is referred as stacking pattern in the present disclosure. The stacking pattern indicates one or more possibilities to store or arrange the one or more objects (102) at each level on the pallet (101). In an embodiment, each level may have a stacking pattern. For example, the stacking pattern may include a horizontal stacking pattern, a vertical stacking pattern and a combination thereof. Further, a Stock Keeping Unit (SKU) marker (103) may be associated with each of the one or more objects (102) stored on the pallet (101) in the inventory (100).

For example, the SKU marker (103) may include an Augmented Reality University of Cordoba (ARuCo) marker, a bar code, a Quick Response (QR) code, a user-defined pattern and the like. The SKU marker (103) may be printed on the one or more objects (102), printed and pasted on the one or more objects (102) and the like.

In one implementation, an image capturing device (104) may be used to capture a plurality of images (105) comprising the one or more objects (102) stored on the pallet (101) in the inventory (100). The image capturing device (104) for example, may be a camera. In one embodiment, one or more image capturing devices may be provided at a plurality of predetermined locations such as on racks in the inventory (100). In another embodiment, the image capturing device (104) may be provided on a drone. In yet another embodiment, a smartphone with the image capturing device (104), a standalone camera and the like may be used to capture the plurality of images (105). Further, the plurality of images (105) are provided to a computing system (106) for determining the stock (108) in the inventory (100). The computing system (106) and the image capturing device (104) may be connected using at least one of a wired interface and a wireless interface via a communication network (not shown in figures).

The communication network may include at least one of a Local Area Network (LAN), Wireless-LAN (WLAN), Bluetooth®, ad-hoc networks, a wide area network, a direct connection using cables such as optical fiber, copper pair, Universal Serial Bus (USB) and the like. The computing system (106) may be implemented as a standalone server, a remote server, a desktop computer, a laptop, a smartphone, and a combination thereof. Further, determining the stock (108) in the inventory (100) indicates computing the quantity of each of the one or more products present in the inventory (100).

In an embodiment, from the plurality of images (105) received from the image capturing device (104), the computing system (106) may identify one or more images (105) which are blur-free and orthographic. For example, one or more images (105) which are blur-free may be identified based on a sharpness value associated with a plurality of the pixels in an image using one or more image processing techniques such as filtering, wavelet transforms, autocorrelation and the like. In another embodiment, an Artificial Intelligence (AI) based technique such as a pre-trained classifier may be used to identify one or more images (105) which are blur-free. In another example, one or more images (105) which are orthographic may be identified from the plurality of images (105) based on geometric analysis of the plurality of the images (105) using image processing techniques such as image transformation, image projection, morphological techniques and the like. The computing system (106) may use the one or more images (105) which are blur-free and orthographic for determining the stock (108) in the inventory (100) and discard the one or more images (105) which are not blur-free and non-orthographic.

In one embodiment, the computing system (106) may estimate a three dimensional (3D) location of the Stock Keeping Unit (SKU) marker (103) associated with each of one or more visible objects (102A) from the one or more objects (102) in the one or more images (105). The 3D location of the SKU marker (103) is indicative of the 3D location of the associated visible object with respect to the pallet (101). The 3D location includes a distance (L) in x-direction, a distance (i.e. height (H)) in y-direction and a distance (i.e. depth (D)) in z-direction for the SKU marker (103). For example, the 3D location i.e. [L, H, D] of an object-1 from the one or more objects (102) may be [2, 5.5, 3] with respect to the pallet (101).

Further, the computing system (106) may determine the stacking pattern of the one or more objects (102) for each level from the one or more levels of stacking on the pallet (101) using one of, the 3D location of SKU marker (103) and a learning model. In an embodiment, the stacking pattern associated with the one or more objects (102) may be obtained from a storage medium (107) associated with the computing system (106). The computing system (106) uses an identification value detected using the SKU marker (103) to retrieve the stacking pattern of the one or more objects (102) from the storage medium (107). In another embodiment, the computing system (106) may provide the one or more images (105) to the learning model. Further, the output of the learning model may include one or more reference stacking patterns and the reference location for the one or more objects (102) in the one or more images (105). The computing system (106) determines the stacking pattern of the one or more objects (102) at each level on the pallet (101) based on the output of the learning model.

In an embodiment, after determining the stacking pattern, the computing system (106) may detect at least one of a presence or an absence of one or more undetected objects at each level based on the stacking pattern and the 3D location of the SKU marker (103) associated with each of one or more visible objects (102A) at the each level of stacking. The one or more undetected objects may include at least one of one or more hidden objects and one or more removed objects. The one or more hidden objects are the objects (102) that are present behind the one or more visible objects (102A). The one or more removed objects are the objects in front of the one or more visible objects (102A) that have been removed or taken out from the pallet (101).

In an embodiment, the computing system (106) may determine the stock (108) in the inventory (100) based on the presence or the absence of the one or more undetected objects and the one or more visible objects (102A) using the one or more images (105). For example, the sum of the one or more visible objects (102A) and the one or more hidden objects at each level on the pallet (101) indicates a quantity of a product-A present in the pallet (101). Similarly, the quantity of one or more products present in other pallets of the inventory (100) is determined using the one or more images (105) corresponding to the other pallets. Further, the stock (108) in the inventory (100) may be determined by aggregating the quantity of each of the one or more products. The stock (108) in the inventory (100) may be indicative of the remaining quantity of the one or more products as shown in FIG. 1. In addition to determining the stock (108), the computing system (106) may provide a name of the product, an incoming quantity of the stock (108), date of purchase, cost of the stock (108), expiry date associated with the stock (108), consumer rating associated with the stock (108), manufacturer of the stock (108) and the like to the user.

Figure 2:
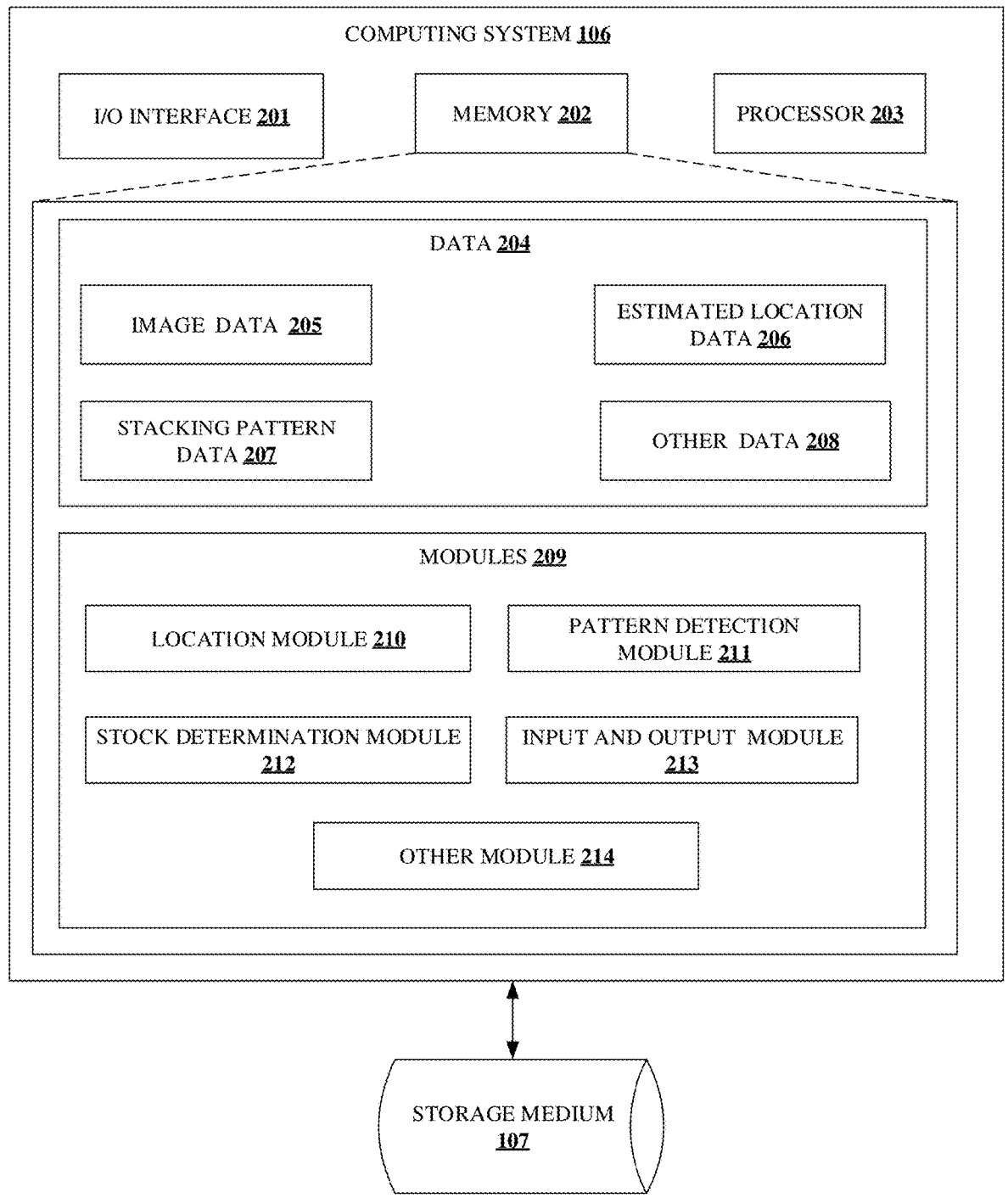
FIG. 2 shows a detailed block diagram of a computing system for determining stock in an inventory, in accordance with some embodiments of the present disclosure.

FIG. 2 shows a detailed block diagram of the computing system (106) determining stock (108) in an inventory (100), in accordance with some embodiments of the present disclosure.

The computing system (106) may include a Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The computing system (106) further includes an Input/Output (I/O) interface (201). The I/O interface (201) may be coupled with the processor (203) through which an input signal or/and an output signal may be communicated. In one embodiment, the plurality of the images (105), the stacking pattern and the reference location may be received through the I/O interface (201).

In some implementations, the computing system (106) may include data (204) and modules (209). As an example, the data (204) and modules (209) may be stored in the memory (202) configured in the computing system (106). In one embodiment, the data (204) may include, for example, an image data (205), estimated location data (206), stacking pattern data (207) and other data (208). In the illustrated FIG. 2, data (204) are described herein in detail. The storage medium (107) may be a part of the memory (204) inside the computing system (106). Alternatively, the storage medium (107) may be an external memory such as a database, compact disk, Universal Storage Bus memory, and the like communicatively connected to the computing system (106).

In an embodiment, the image data (205) may include the plurality of images (105) captured by the image capturing device (104). Further, the image data (205) may include the one or more images (105) which are blur-free and orthographic identified from the plurality of images (105).

In an embodiment, the estimated location data (206) may include the 3D location i.e. [L, H, D] of the SKU marker (103) associated with the one or more visible objects (102A) in the one or more images (105). The 3D location indicates the distance (L) in x-direction, the distance (i.e. height (H)) in y-direction and the distance (i.e. depth (D)) in z-direction for the SKU marker (103) with respect to the pallet (101).

In an embodiment, the stacking pattern data (207) may include the stacking pattern determined for the one or more objects (102) at each level of stacking on the pallet (101). Further, the stacking pattern data (207) may include one or more reference stacking patterns indicative of the reference location of the one or more objects (102) at each level on the pallet (101). In one embodiment, the one or more reference stacking patterns may be stored in the storage medium (107). The one or more reference stacking patterns indicate one or more approaches for storing the one or more objects (102) at each level of stacking. The one or more objects (102) may be stored using the horizontal stacking pattern, the vertical stacking pattern and a combination thereof at each level of stacking. In a first example, 12 boxes or containers indicating the one or more objects (102) may be stored on the pallet (105). The 12 objects (102) may be arranged such that, 4 objects (102) may be placed adjacently forming a first row, and 2 such rows behind the first row (i.e. a total of 3 rows) using the vertical stacking pattern. In a second example, the 12 objects (102) may be stored such that, 3 objects (102) may be adjacently forming a first row and 3 such rows behind the first row (i.e. a total of 4 rows) using the horizontal stacking pattern. Further, the stacking pattern data (207) may include a mapping table indicative of interdependency of the one or more visible objects (102A) placed on the pallet (101). The mapping table may be used to identify the one or more undetected visible objects in each of the one or more images (105). For example, the one or more undetected visible objects include one or more objects (102) visible in the one or more images (105), but the SKU marker (103) associated with the one or more visible objects (102) is not detected.

In an embodiment, the other data (208) may include data related to at least one of computer vision techniques for identifying the SKU marker (103), one or more image processing techniques such as filtering, wavelet transforms, autocorrelation, image transformation, image projection, morphological techniques for identifying one or more images (105) which are blur-free and orthographic. Further, the other data (208) may include at least one of stock (108) determined in the inventory (100), an aggregated error between the 3D location of the SKU marker (103) associated with each of the one or more visible objects (102A) at each level and the reference location of the SKU marker (103) (i.e. reference location of the one or more objects (102), and the like.

In some embodiments, the data (204) may be stored in the memory (202) in the form of various data structures. Additionally, the data (204) may be organized using data models, such as relational or hierarchical data models. The other data (208) may store data, including temporary data and temporary files, generated by the modules (209) for performing the various functions of the computing system (106).

In some embodiments, the data (204) stored in the memory (202) may be processed by the modules (209) communicatively coupled to the processor (203) of the computing system (106). The modules (209) may be stored within the memory (202) as shown in FIG. 2. In one embodiment, the modules (209) may be present outside the memory (202) and implemented as hardware. As used herein, the term modules (209) may refer to an Application Specific Integrated Circuit (ASIC), a Field Programmable Gate Array (FPGA), an electronic circuit, a processor (shared, dedicated, or group) that execute one or more software or firmware programs, a combinational logic circuit, and/or other suitable components that provide the described functionality.

In one implementation, the modules (209) may include, for example, a location module (210), a pattern detection module (211), a stock determination module (212), an input and output module (213), and other module (214). It may be appreciated that such aforementioned modules (209) may be represented as a single module or a combination of different modules.

In an embodiment, the location module (210) may be used to identify the SKU marker (103) associated with each of the one or more visible objects (102A) in each of the one or more images (105) using computer vision techniques. Further, the location module (210) may estimate the 3D location of the SKU marker (103) associated with each of the one or more visible objects (102A) from the one or more images (105) using at least one of a pose estimation technique and a geometry information associated with the image capturing device (104). The pose estimation technique may be based on computer vision techniques such as geometric projection, 3D reconstruction, Perspective-n-Point technique aided by AI techniques such as convolutional neural networks, recurrent neural networks, deep neural networks, generative and discriminative models, support vector machines, regression techniques and the like. The geometry information associated with the image capturing device (104) may include at least one of focal length, principal point, center of projection, and the like. The geometry information of the camera may be obtained using at least one of a perspective camera model, affine camera model and the like.

In an embodiment, the pattern detection module (211) may be used to detect an identification value in the SKU marker (103) associated with the one or more visible objects (102A) in each of the one or more images (105). Further, the identification value may be used to identify one or more details associated with the one or more objects (102) in the inventory (100). The one or more details includes at least a dimension of the one or more objects (102) and the stacking pattern at each level in the pallet (101). In another embodiment, the pattern detection module (211) may be used obtain the one or more reference stacking patterns indicative of a reference location for the one or more objects (102) in the pallet (101) from the learning model based on the one or more images (105). The learning model is pre-trained using Artificial Intelligence (AI) based learning techniques with one or more details associated with one or more objects (102). Further, the pattern detection module (211) may determine the aggregated error between the 3D location of the SKU marker (103) associated with each of the one or more visible objects (102A) at each level and the reference location of the SKU marker (103). Furthermore, the pattern detection module (211) may select the stacking pattern for each level from the one or more levels of stacking in the pallet (101) based on the aggregated error determined for corresponding level.

In an embodiment, the stock determination module (212) may be used to aggregate a first count associated with the one or more hidden objects and a second count associated with the one or more visible objects (102A) for the each level from the one or more levels for determining the stock (108) on the pallet (101). Further, the stock (108) determination module (212) may compute an error tolerance associated with the pallet (101) based on the 3D location of the SKU marker (103) and the reference location of the SKU marker (103). Furthermore, the stock (108) determination module (212) may accept the determined stock (108) when the error tolerance is less than the predefined threshold value or reject the determined stock (108) when the error tolerance is greater than the predefined threshold value.

In an embodiment, the input and output module (213) may be used to receive the plurality of images (105) from the image capturing device (104) using at least one of the wired interface and the wireless interface via the communication network (not shown in figures). The communication network may include at least one of a local area network (LAN), Wireless-LAN (WLAN), Bluetooth®, ad-hoc networks, a wide area network, a direct connection using cables such as optical fiber, copper pair and the like. Further, the input and output module (213) may be used provide the stock (108) determined in the inventory (100) to a user.

In an embodiment, the other module (214) may be used to identify a presence of the one or more undetected visible objects in each of the one or more images (105) when the identification of the SKU marker (103) associated with the one or more visible objects (102A) fails. The other module (214) may identify the presence of one or more undetected visible objects based on the mapping table indicative of inter-dependency of the one or more visible objects (102A) placed on the pallet (101).

Figure 3:
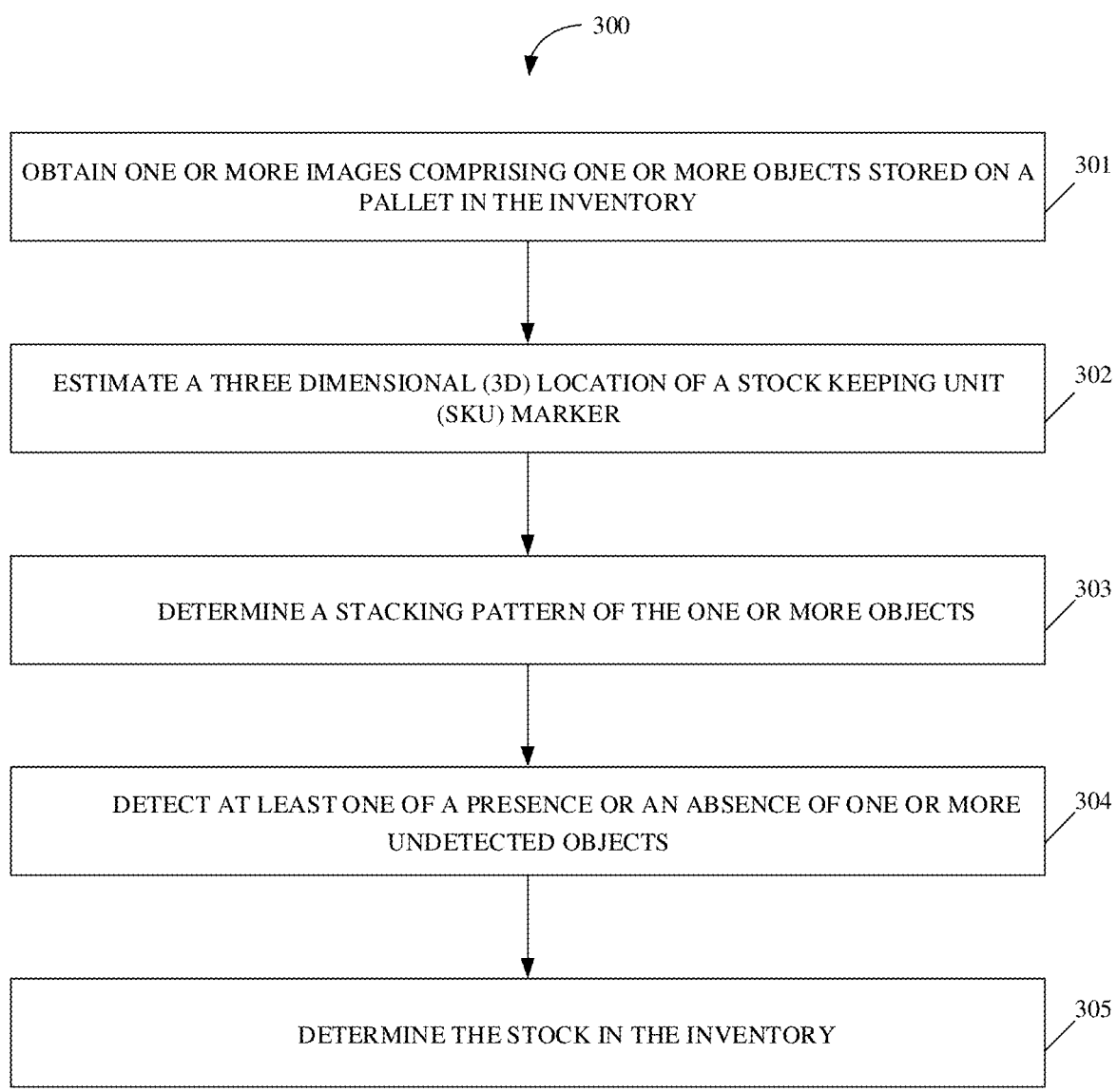
FIG. 3 shows a flowchart illustrating method steps for determining stock in an inventory, in accordance with some embodiment of the present disclosure.

FIG. 3 shows a flowchart illustrating method steps for determining stock (108) in an inventory (100), in accordance with some embodiment of the present disclosure.

The order in which the method 300 may be described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At the step 301, the computing system (106) may obtain the one or more images (105) comprising one or more objects (102) stored on a pallet (101) in the inventory (100).

In an embodiment, the computing system (106) may obtain the one or more images (105), in real-time, from the image capturing device (104). In another embodiment, computing system (106) may obtain the one or more images (105) from the storage medium (107) associated with the computing system (106).

Figure 4A:
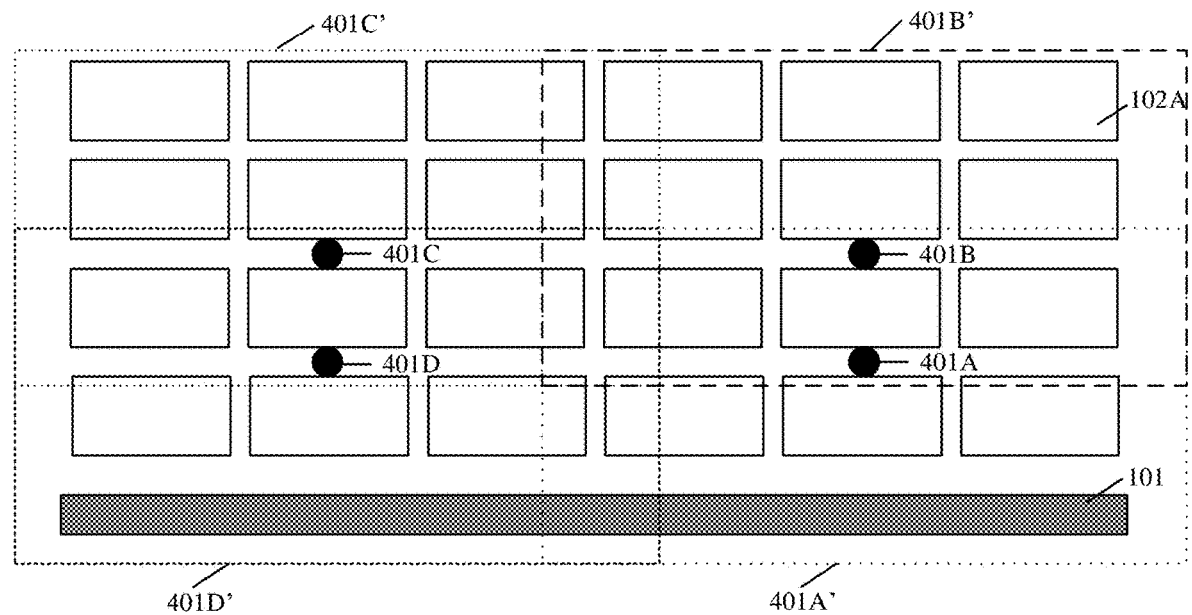
FIG. 4A shows an exemplary environment for capturing a plurality of images using an image capturing device, in accordance with some embodiments of the present disclosure.

In one embodiment, the computing system (106) receives the plurality of images (105) from the image capturing device (104). The image capturing device (104) may include at least one of the cameras provided at a plurality of predetermined locations such as on racks in the inventory (100), the camera provided on the drone, a robot with a camera, the standalone camera, the smartphone with the camera and the like. Further, the plurality of images (105) may be captured by the image capturing device (104) by modifying the one or more camera parameters such as flash light, exposure time, aperture, shutter speed, ISO sensitivity and the like. Furthermore, the plurality of images (105) may be captured from one or more positions (401A, 401B, 401C and 401D, collectively denoted as 401) in the inventory (100) as shown in FIG. 4A. The dotted boxes (401A', 401B', 401C' and 401D') indicate a region of the pallet (101) captured by the image capturing device (104) from the one or more positions (401 i.e. 401A, 401B, 401C and 401D) respectively. For example, the one or more positions (401) are indicated by at least one of a vertical movement, a horizontal movement and a combination thereof associated with the image capturing device (104). The one or more positions (401) are derived with the pallet (101) as the reference position. The plurality of images (105) captured by the image capturing device (104) in the one or more positions (401) includes the entire pallet (101) associated with the one or more objects (102). The entire pallet (101) is determined using at least one of a left edge of the pallet (101), a right edge of the pallet (101), a pallet marker (103) indicative of bottom edge of the pallet (101), the racks, a pallet marker (103) associated with another pallet (101) indicative of the top edge of the pallet (101) and the like. Further, the vertical movement and the horizontal movement for the image capturing device (104) may be performed until the entire pallet (101) is captured using the plurality of the images (105). Further, the person skilled in the art appreciates the use of one or more image processing techniques such as image segmentation, image detection, image recognition, image stitching, morphological operations, and the like may be performed to obtain an image comprising the entire pallet (101) and an overlapped portions of the pallet (101) in the plurality of the images (105).

In one embodiment, after receiving the plurality of images (105) from the image capturing device (104), the computing system (106) may identify the one or more images (105) which are blur-free and orthographic from the plurality of images (105). For example, one or more images (105) which are blur-free may be identified based on a sharpness value associated with a plurality of the pixels in an image using one or more image processing techniques such as filtering, wavelet transforms, autocorrelation and the like. In another embodiment, an Artificial Intelligence (AI) based technique such as a pre-trained classifier may be used to identify one or more images (105) which are blur-free. In another example, one or more images (105) which are orthographic may be identified from the plurality of images (105) based on geometric analysis of the plurality of the images (105) using image processing techniques such as image transformation, image projection, morphological techniques and the like.

Figure 4B:
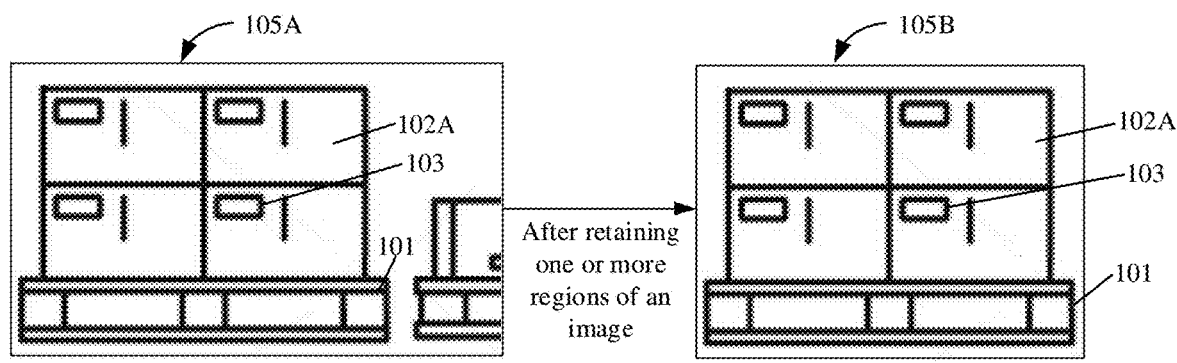
FIG. 4B shows an exemplary image before and after retaining one or more regions of the image, in accordance with some embodiments of the present disclosure.

In an embodiment, after identifying the one or more images (105) which are blur-free and orthographic, the computing system (106) may retain one or more regions of an image (105A and 105B indicating before and after retaining the one or more regions respectively) associated with the pallet (101) in each of the one or more images (105) as shown in FIG. 4B. The person skilled in the art appreciates the use of one or more image segmentation techniques and image cropping techniques based on the left edge, the right edge, the bottom edge and the top edge of the pallet (101) to retain one or more regions of an image. For example, one or more regions of the image within the left edge, the right edge, the bottom edge and the top edge of the pallet (101) are retained and the one or more regions of the image outside the left edge, the right edge, the bottom edge and the top edge of the pallet (101) are removed as shown in FIG. 4B.

After the completion of the step (301), the one or more images (105) from the plurality of the images (105) are obtained. Where the one or more images (105) are blur-free, orthographic, and includes only the pallet (101) with the one or more objects (102) with the surrounding regions of the pallet (101) removed.

Referring back to FIG. 3, at the step 302, the computing system (106) may estimate a three dimensional (3D) location of the SKU marker (103) associated with each of the one or more visible objects (102A) from the one or more objects (102) in the one or more images (105). The 3D location of the SKU marker (103) is indicative of the 3D location of the associated visible object with respect to the pallet (101).

In an embodiment, the SKU marker (103) may be printed on the one or more objects (102), pasted on the one or more objects (102) and the like. For example, the SKU marker (103) such as an alphanumeric code (i.e. SKU KS93528TUT) may be printed on the one or more objects (102). The computing system (106) may identify the SKU marker (103) associated with each of the one or more visible objects (102A) in each of the one or more images (105) using computer vision techniques. The person skilled in the art appreciates the use of computer vision techniques such as object detection techniques, template matching techniques, adaptive thresholding, contour filtering, deep neural networks and the like to identify the presence or the absence of the SKU marker (103) in the one or more images (105).

Figure 4C:
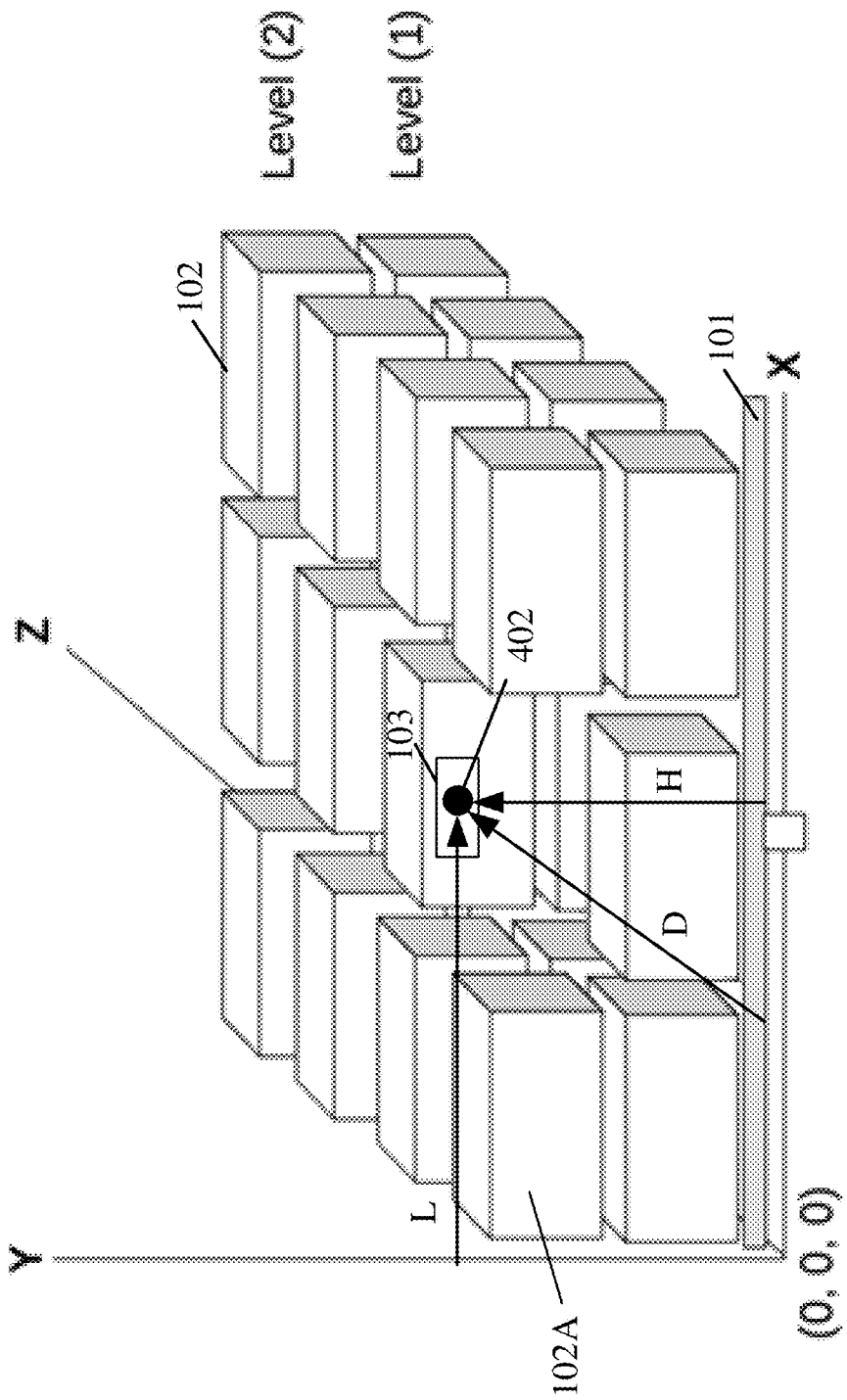
FIG. 4C shows an exemplary illustration of estimating 3-D location of a Stock Keep Unit (SKU) maker, in accordance with some embodiments of the present disclosure.

Further, the computing system (106) may determine the 3D location (402) of the SKU marker (103) associated with each of the one or more visible objects (102A) from the one or more images (105) using at least one of a pose estimation technique and the geometry information associated with the image capturing device (104) as shown in FIG. 4C. The one or more visible objects (102A) indicate the one or more products and the SKU marker (103) associated with each of the one or more products visible in the one or more images (105). The 3D location (402) includes the distance (L) in x-direction, the height (H) in y-direction and the depth (D) in z-direction for the SKU marker (103) in each of the one or more images (105). For example, if 10 SKU markers are visible in the one or more images (105), then the computing system (106) determines the 3D location (402) for each of the 10 SKU markers. The 3D location (402) may be measured using meters, centimeters, a count of pixels, a percentage with respect to a reference point such as the pallet marker (103) and the like. The 3D location (402) of each of the SKU markers may be denoted as a vector of 3 values [L, H, D]. For example, the 3D locations for 3 objects (102) may be represented as [9, 3, 5], [6, 5, 0], [63, 204, 371] and the like. Further, the pose estimation technique may be based on computer vision techniques such as the geometric projection, the 3D reconstruction, the Perspective-n-Point technique aided by AI techniques such as convolutional neural networks, recurrent neural networks, deep neural networks, generative and discriminative models, support vector machines, regression techniques and the like. The geometry information associated with the image capturing device (104) may include at least one of focal length, principal point, center of projection, and the like. The geometry information of the camera may be obtained using at least one of a perspective camera model, affine camera model and the like.

At the end of step 302, the 3D location (402) of the SKU markers visible in the one or more images (105) are estimated.

Referring back to FIG. 3, at the step (303), the computing system (106) may determine the stacking pattern of the one or more objects (102) for each level from the one or more levels of stacking on the pallet (101) using one of the 3D location (402) of SKU marker (103) and the learning model.

In an embodiment, the SKU marker (103) may include for example, the ARuCo marker, the bar code, the Quick Response (QR) code, the user-defined pattern, the alphanumeric code and the like. The SKU marker (103) associated with each of the one or more objects (102) is a scannable code including information such as the identification value indicative of a product-id, a manufacturer of the product, a price of the product, a dimension of the product, a category of the product, a name of the product and the like. In one embodiment, for determining the stacking pattern for the one or more objects (102) at each level of stacking in the pallet (101) using the SKU marker (103), the computing system (106) may detect the identification value (403) in the SKU marker (103) associated with each of the one or more visible objects (102A) as shown in FIG. 4D.

Figures 4D, 4E:
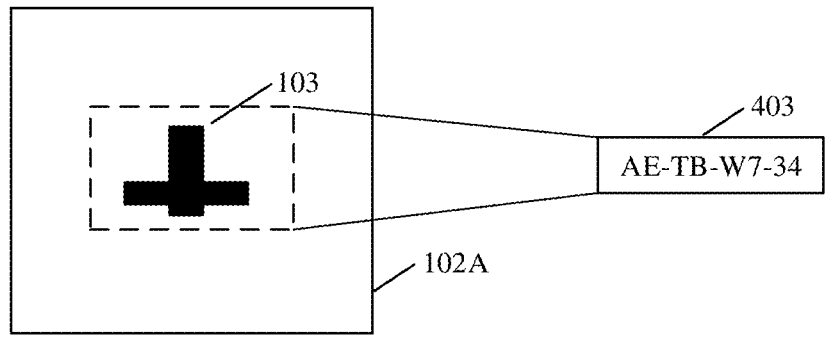
FIG. 4D shows an exemplary illustration of detecting an identification value from a Stock Keep Unit (SKU) maker, in accordance with some embodiments of the present disclosure.
FIG. 4E shows an exemplary table comprising details associated with the identification value, in accordance with some embodiments of the present disclosure.
Figure 4F:
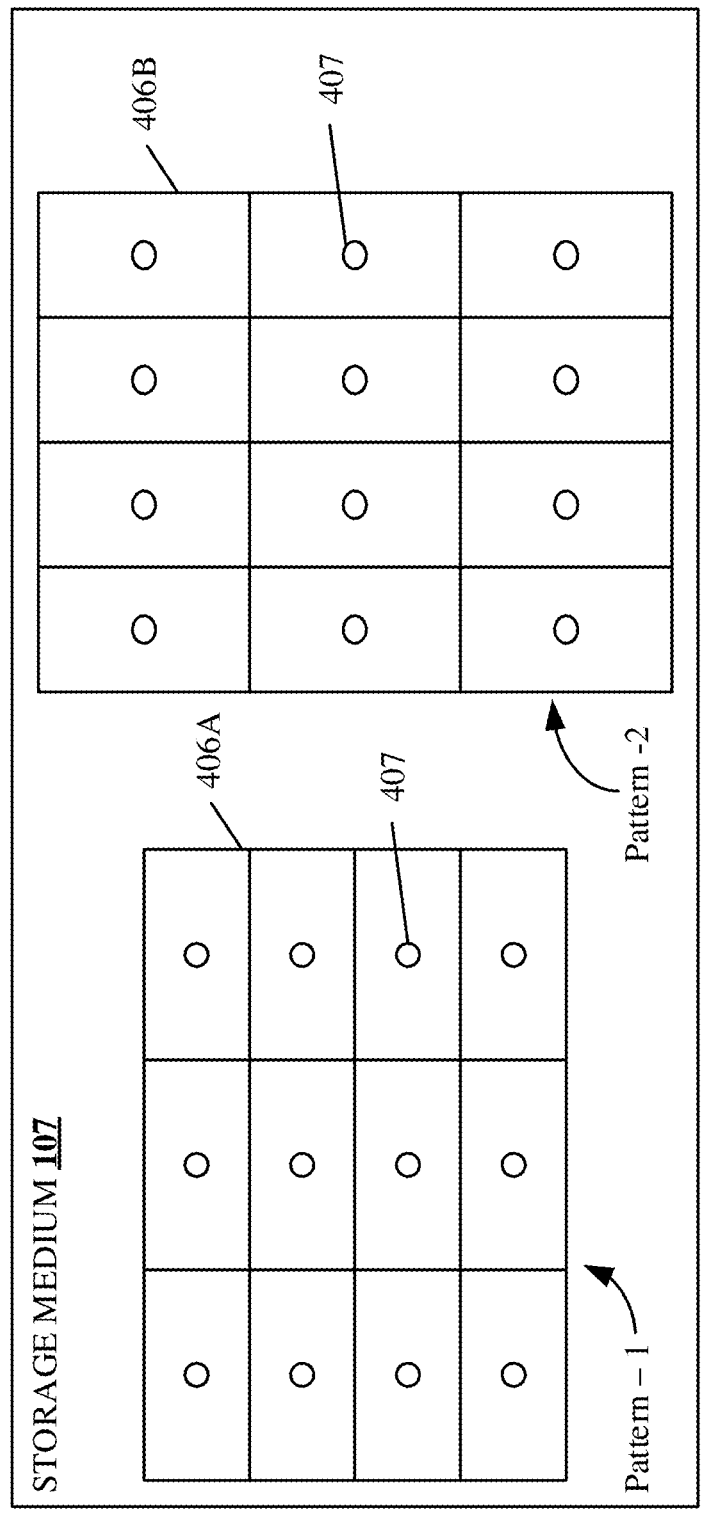
FIG. 4F shows an exemplary stacking pattern for a pallet obtained using the Stock Keep Unit (SKU) maker, in accordance with some embodiments of the present disclosure.

In an embodiment, the computing system (106) may use the identification value (403) to identify one or more details (404) associated with the one or more objects (102) as shown in FIG. 4E. The one or more details (404) comprises at least a dimension (405) of the one or more objects (102) and the stacking pattern (406) for each level of stacking on the pallet (101). The one or more details (404) may be stored in the storage medium (107) as shown in FIG. 4E. Further, the computing system (106) obtains the stacking pattern (406) for the one or more objects (102) corresponding to the each level from the one or more levels of stacking in the pallet (101) from the storage medium (107). For example, the stacking pattern (406) may indicate an approach from one or more approaches to store the one or more objects (102) at each level of stacking as shown in FIG. 4F. The "Pattern-1" and "Pattern-2" as shown in FIG. 4F denotes a top view of the one or more objects (102) stored on the pallet (101) at different levels (e.g., level-1 and level-2). In addition the stacking pattern (406) may indicate the reference location (407) (denoted using a circle) of the SKU marker (103) associated with each of the one or more objects (102) stored at each level of stacking as shown in FIG. 4F. The reference location (407) may be denoted using the [L, H, D] similar to the 3D location (402) determined using the pose estimation techniques. In another embodiment, the reference location (407) may be specified for level 1 and the reference location (407) for the SKU markers at other levels may be determined using the dimension (405) of the one or more objects (102). In an embodiment, the reference location may be a centre of the one or more objects (102).

Figure 4G:
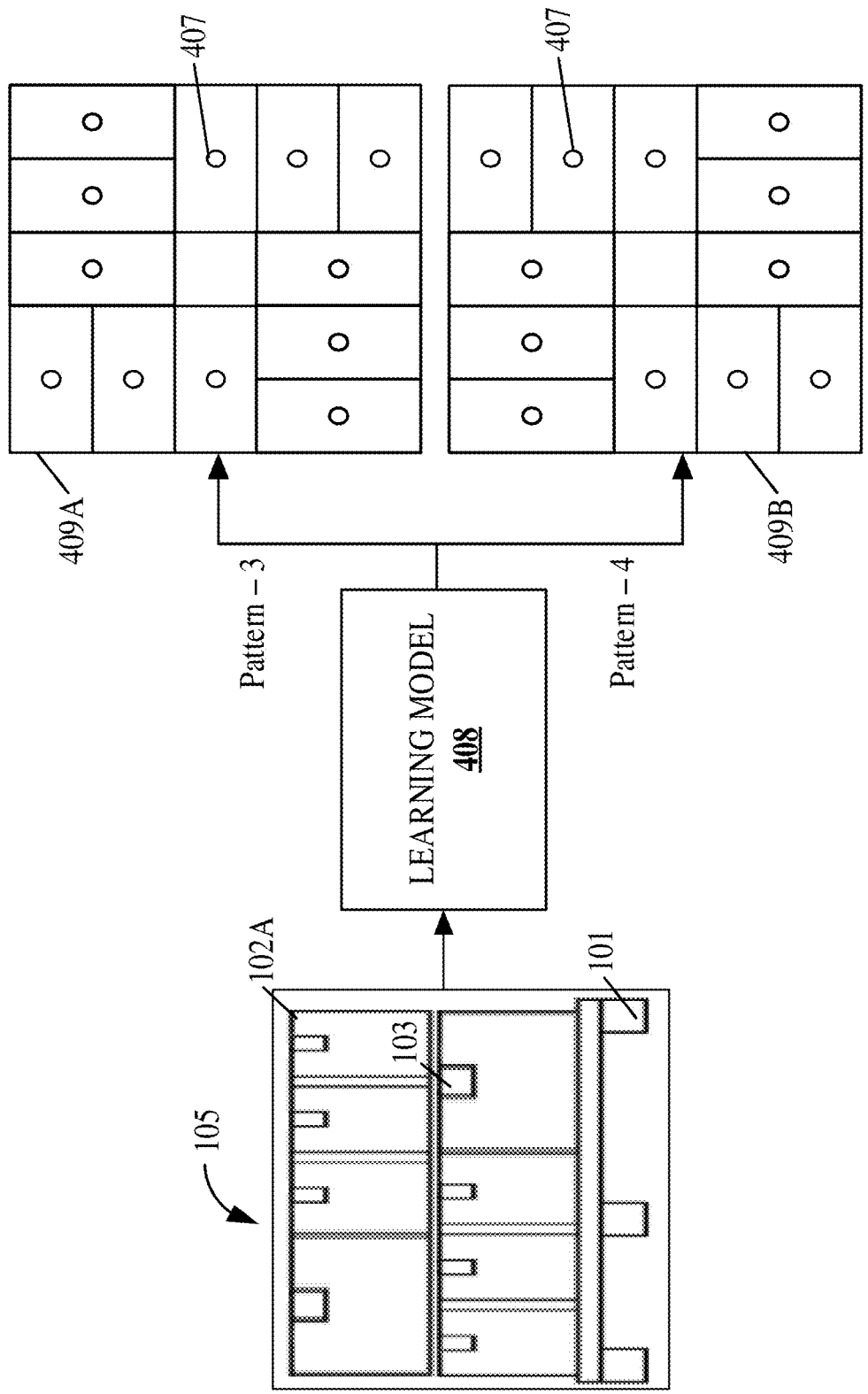
FIG. 4G shows an exemplary reference staking patterns obtained from a learning model, in accordance with some embodiments of the present disclosure.

In an embodiment, for determining the stacking pattern (406) of the one or more objects (102) at each level of stacking in the pallet (101) using the learning model (408), the computing system (106) may obtain one or more reference stacking patterns (409A and 409B collectively denoted as 409) indicative of the reference location (407) for the one or more objects (102) in the pallet (101) from the learning model (408) based on the one or more images (105) as shown in FIG. 4G. The one or more reference stacking patterns (409) as shown in FIG. 4G denote a top view of the stacking pattern (406) with one or more objects (102) stored on the pallet (101). The dimension (405) of the one or more objects (102) may be obtained in addition to the one or more reference stacking patterns (409). The one or more reference stacking patterns (409) may indicate one or more approaches to store the one or more objects (102) at each level of stacking as shown in FIG. 4G. Further, the learning model (408) is pre-trained using Artificial Intelligence (AI) based learning techniques with one or more details (404) associated with one or more objects (102). The learning model (408) may include at least one of a regression techniques, support vector machines, clustering techniques, deep neural network architecture based convolutional neural networks, recurrent neural networks, generative and discriminative networks, and the like. The AI based learning techniques include supervised learning technique, unsupervised learning technique and reinforcement learning technique. The learning model (408) is pre-trained using a training dataset, wherein the learning model (408) learns to predict the stacking pattern (406) for the one or more objects (102) in the one or more images (105). The training dataset may include the one or more details (404), but not limited to, the dimension (405) of the one or more objects (102), an actual stacking pattern (406), and a plurality of images (105) comprising the one or more objects (102).

The learning model (408) provides one or more reference stacking patterns (409) as an output corresponding to the one or more images (105) provided as an input to the learning model (408). The one or more reference stacking patterns are indicative of one or more possible approaches to store the one or more objects (102) at each level on the pallet (101).

Figure 4H:
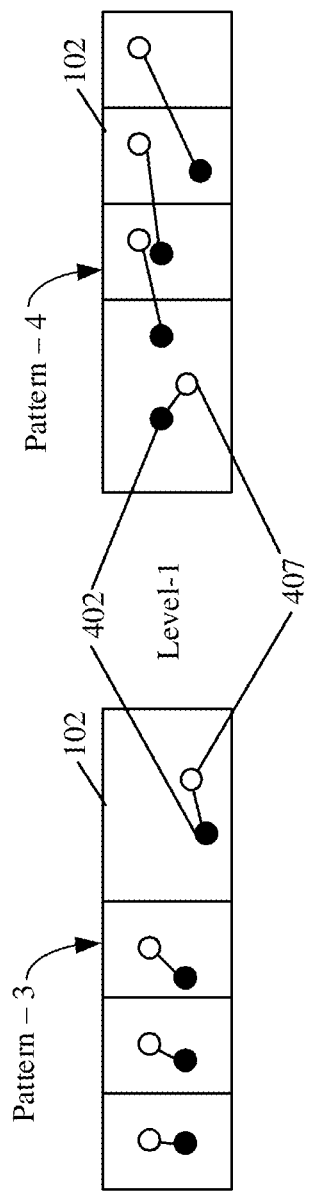
FIG. 4H shows an exemplary illustration of determining aggregated error in 3D location to select a stacking pattern from the reference staking patterns, in accordance with some embodiments of the present disclosure.

In an embodiment, from the one or more reference stacking patterns (409A and 409B collectively denoted as 409) obtained from the learning model (408), the computing system (106) selects the stacking pattern (406) for each level of stacking in the pallet (101) using the aggregated error. The computing system (106) determines the aggregated error between the 3D location (402) of the SKU marker (103) associated with each of the one or more visible objects (102A) at each level and the reference location (407) of the SKU marker (103) as shown in FIG. 4H. The "Pattern-3" and "Pattern-4" as shown in FIG. 4H denotes a front view of the one or more visible objects (102A). The aggregated error for a reference stacking pattern (406) is the sum of absolute value of an individual error between each of the 3D location (402) of the SKU marker (103) with a corresponding reference location (407) of the SKU marker (103). Further, the individual error is determined using one of a Euclidean distance technique, Manhattan distance technique, Hamming distance technique and the like. For example, if the learning model (408) provides "Pattern-3" and "Pattern-4" as the one or more reference stacking patterns (409), the computing system (106) determines the aggregated error corresponding to "Pattern-3" and "Pattern-4" for level-1 as shown in FIG. 4H. The aggregated error for level-1 with respect to "Pattern-3" may be 1.2 and with respect to "Pattern-4" may be 3.46. Further, the computing system (106) may select the staking pattern for each level from the one or more levels of stacking in the pallet (101) based on the aggregated error determined for corresponding level. For example, the computing system (106) selects one of the reference stacking pattern (406) having a minimum aggregated error as the stacking pattern (406) for each level from the one or more stacking patterns. The computing system (106) selects the "Pattern-3" as the stacking pattern (406) for level-1 since the aggregated error for "Pattern-3" (i.e. 1.2) is lesser than the aggregated error for "Pattern-4" (i.e. 3.46). Similarly, the stacking pattern (406) is determined for each of stacking in the pallet (101).

Figure 4I:
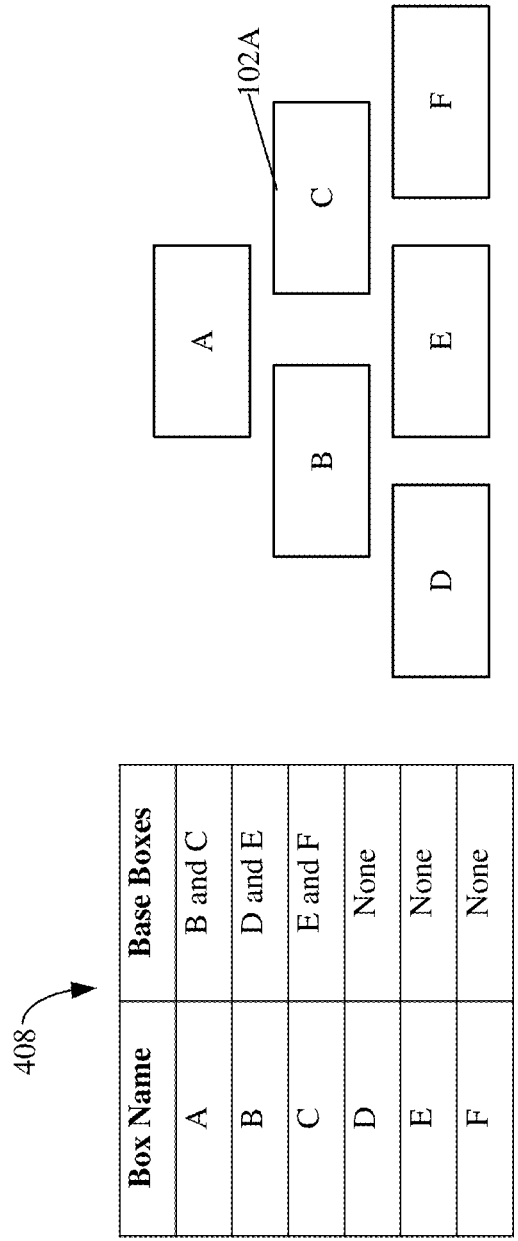
FIG. 4I and FIG. 4J shows an exemplary mapping table for determining one or more undetected visible objects, in accordance with some embodiments of the present disclosure.
Figure 4J:
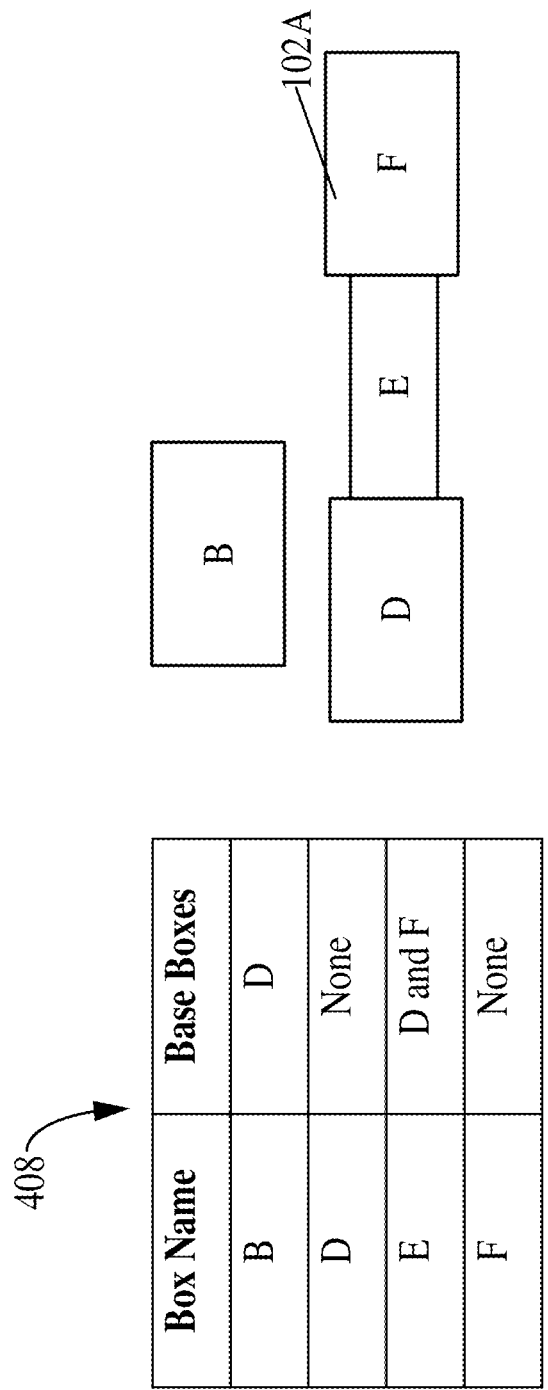

In an embodiment, after determining the stacking pattern (406), the computing system (106) may identify the one or more undetected visible objects in each of the one or more images (105), when the identification of the SKU marker (103) associated with the one or more visible objects (102A) fails. For example, when the SKU marker (103) is absent or when the SKU marker (103) is damaged, the computing system (106) fails to estimate the 3D location (402) of the SKU marker (103) which results in a miscount while determining the stock (108) on the pallet (101). Further, the computing system (106) may use the mapping table (410) indicative of inter-dependency of the one or more visible objects (102A) placed on the pallet (101) to identify the one or more undetected visible objects as shown in FIG. 4I and FIG. 4J. The mapping table (410) may be stored in the storage medium (107). The mapping table (410) may include one or more base boxes (i.e. the one or more visible objects (102A)) required to be present in the one or more images (105) of the pallet (101) for each of the one or more visible objects (102A) detected in the pallet (101). In addition the mapping table (410) may include one or more threshold values associated with the distance (L), the height (H), and the depth (D) of the one or more objects (102) in the pallet (101). For example, referring back to FIG. 4I, when the identification of the SKU marker (103) associated with the one or more visible objects (102A) (i.e. B and C) fails, and when the one or more visible objects (102A) (i.e. A) are detected, then the computing system (106) determines that there are one or more undetected visible objects (i.e. B and C) using the mapping table (410) which indicates that the base boxes for the visible object (i.e. A) are (B and C). Alternatively, the base boxes (B and C) for the visible object (i.e. A) indicates that, for the visible object (i.e. A) to be present on the pallet (101), the one or more undetected visible objects (i.e. B and C) are required to be present on the pallet (101). In another example, referring to FIG. 4J, the object (E) is present on the pallet (101) with a depth different from the depth of the object (D and F). When the identification of the SKU marker (103) associated with the one or more visible objects (102A) (i.e. E) fails, and when the one or more visible objects (102A) (i.e. D and F) are detected, then the computing system (106) identifies the presence of the one or more undetected visible objects (i.e. E) using the one or more threshold values associated with the distance (L), the height (H), and the depth (D) stored in the mapping table (410). The threshold values are decided based on the attributes like maximum length of the robotic arm, human reach, trapped boxes in the stacking pattern, and the like.

Figure 4K:
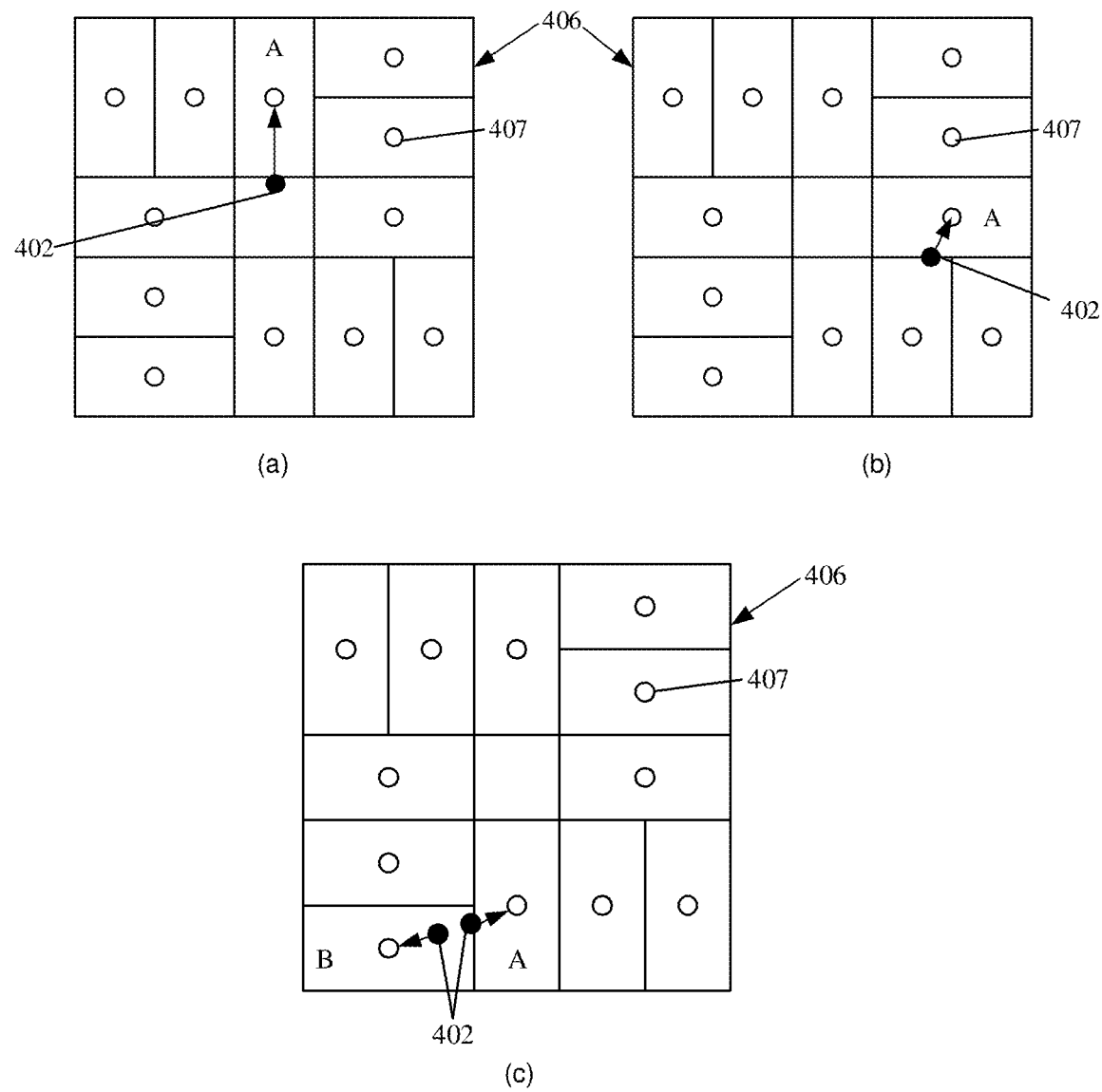
FIG. 4K shows an exemplary illustration for refining of 3-D location of the SKU marker, in accordance with some embodiments of the present disclosure.

In an embodiment, upon determining the stacking pattern (406), the computing system (106) refines the 3D location (402) of the SKU markers. The computing system (106) obtains the reference location (407) of the SKU marker (103) which indicates the reference location (407) of the one or more objects (102), using the stacking pattern (406). In one embodiment, the reference location (407) is obtained from the storage medium (107). In another embodiment, the reference location (407) is obtained from the learning model (408). Further, the computing system (106) determines the error between the 3D location (402) of the SKU marker (103) and the reference location (407) of the SKU marker (103) for each of the one or more visible objects (102A) at the each level from the one or more levels in the one or more images (105). In an embodiment, for each level on the pallet (101), the computing system (106), determines the error between the 3D location (402) of the SKU marker (103) associated with the one or more visible objects (102A) and the reference location (407) of the SKU marker (103) corresponding to the each level. Further, the error is determined using one of a Euclidean distance technique, Manhattan distance technique, Hamming distance technique and the like. If the error is greater than a predetermined threshold, then the computing system (106) may refine the 3D location (402) of the SKU marker (103). The predetermined threshold may be predetermined by the user based on the stacking pattern (406) and stored in the storage medium (107). For example, the predetermined threshold may be 5, 9.8, 27.9 and the like. Furthermore, the computing system (106) refines the 3D location (402) of the SKU marker (103) associated with each of one or more visible objects (102A) at each level based on the stacking pattern (406) and the error using at least one of proximity analysis, boundary position of the one or more objects (102), and an statistical analysis of the 3D location (402) of the SKU marker (103) and the reference location (407) of the SKU marker (103). The statistical analysis may include techniques such as mean, standard deviation, minimum error, maximum error and the like. The computing system (106) may refine the 3D location (402) by modifying the values of the distance (L), the height (H), and the depth (D) associated with the SKU marker (103). For example, referring to FIG. 4K, the 3D location (402) of the SKU marker (103) having the error greater than the predetermined threshold is indicated in the drawings (a), (b) and (c) using a filled circle (402). In addition the reference location (407) of the one or more objects (102) at the corresponding level is indicated in the drawings (a), (b) and (c) of FIG. 4K using an unfilled circle (407). The stacking patterns (406) as shown in FIG. 4K, is the top view of the staking pattern. In a first example, referring to drawing (a) of FIG. 4K, the computing system (106) may use the statistical analysis such as minimum error to identify the reference location (407) having a minimum error with the 3D location (402), thereby mapping the 3D location (402) to the object-A and refining or modifying the 3D location (402) to reference location (407) of the object-A as shown in drawing (a) of the FIG. 4K. In a second example, referring to drawing (b) of FIG. 4K, the computing system (106) may use the proximity analysis to identify the reference location (407) nearest to the 3D location (402), thereby mapping the 3D location (402) to the object-A and refining or modifying the 3D location (402) to reference location (407) of the object-A as shown in drawing (a) of the FIG. 4K. In a third example, referring to drawing (c) of FIG. 4K, the computing system (106) may use the boundary position of the one or more objects (102) and the statistical analysis to identify the reference location (407) nearest to the 3D location (402), thereby mapping the 3D location (402) to the object-A and object-B, and refining or modifying the 3D location (402) to reference location (407) of the object-A and object-B as shown in drawing (a) of the FIG. 4K.

At the end of step 303, the one or more undetected visible objects in the pallet (101) are detected. Further, the stacking pattern (406) for each level on the pallet (101) is determined.

Referring back to FIG. 3, at the step 304, the computing system (106) detects at least one of a presence or an absence of one or more undetected objects at each level based on the stacking pattern (406) and the 3D location (402) of the SKU marker (103) associated with each of one or more visible objects (102A) at the each level of stacking.

In an embodiment, the one or more undetected objects includes at least one of one or more hidden objects and one or more removed objects. The one or more hidden objects indicate the one or more objects (102) present on the pallet (101) but not visible in the one or more images (105). The one or more removed objects indicate the one or more objects (102) not present on the pallet (101). The presence or the absence of the one or more undetected objects on the pallet (101) is determined for each level of the stacking from the one or more levels.

Figure 4L:
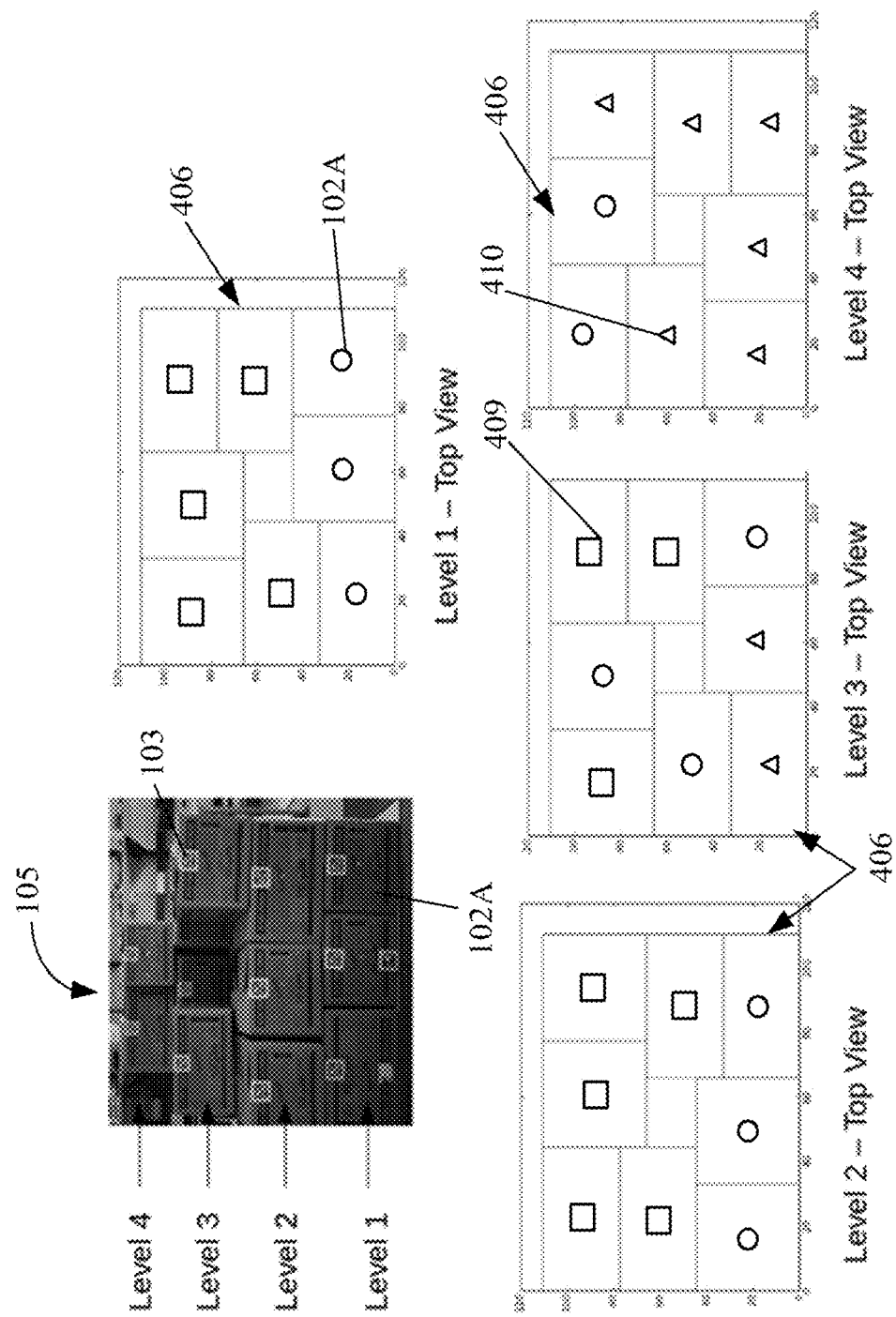
FIG. 4L and FIG. 4M shows an exemplary illustration of detection of the one or more undetected objects and one or more visible objects for determining a stock in a pallet, in accordance with some embodiments of the present disclosure.
Figure 4M:
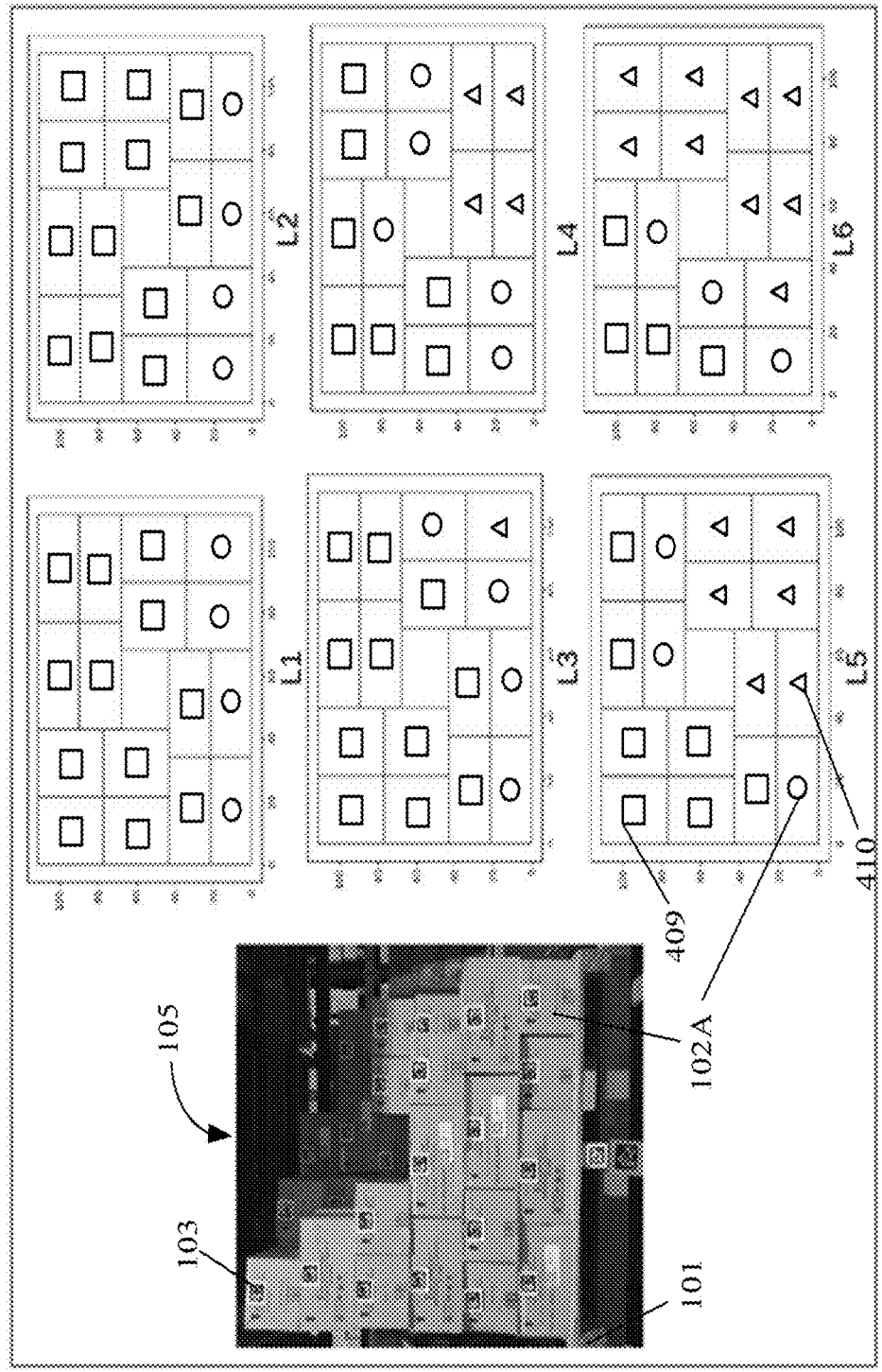

In an embodiment, the computing system (106) may apply a backward scanning technique to identify the one or more hidden objects in each level from the one or more levels based on the 3D location (402) of the SKU marker (103) in each level of stacking and the stacking pattern (406). The computing system (106) may identify the one or more visible objects (102A) in the stacking pattern (406) for each level of stacking. The one or more visible objects (102A) in the stacking pattern (406) is identified using the 3D of the SKU marker (103) and the reference location (407) of the SKU marker (103) in the stacking pattern (406). Further, the one or more objects (102) behind the one or more visible objects (102A) in the stacking pattern (406) may be identified as the one or more hidden objects for each level of stacking using the backward scanning technique. For example, referring to FIG. 4L and FIG. 4M, the one or more visible objects (102A) identified at each level based on the 3D location (402) of the SKU marker (103) is denoted by an un-filled circle (102A) symbol. Further, the one or more hidden objects (411) identified at each level using the backward scanning technique is denoted by a square (411) symbol as shown in FIG. 4L and FIG. 4M. The stacking patterns (406) as shown in FIG. 4L and FIG. 4M, denote the top view of the staking pattern.

In an embodiment, the computing system (106) may identify the one or more removed objects in the each level from the one or more levels based on the stacking pattern (406), the one or more hidden objects (411) and the 3D location (402) of the SKU marker (103) using a forward scanning technique. In an embodiment, the computing system (106) may identify the one or more objects (102) in front of the one or more visible objects (102A) as the one or more removed objects (412) using the forward scanning technique. For example, referring to FIG. 4L and FIG. 4M, the one or more removed objects (412) identified at each level using the forward scanning technique is denoted by a triangle (412) symbol as shown in FIG. 4L and FIG. 4M.

At the end of the step 304, the one or more objects (102) in each level on the pallet (101) is categorized as at least one of one or more visible objects (102A), one or more hidden objects (411), one or more removed objects (412).

Referring back to FIG. 3, at the step 305, the computing system (106) may determine the stock (108) in the inventory (100) based on the presence or the absence of the one or more undetected objects and the one or more visible objects (102A) from the one or more images (105).

In an embodiment, the computing system (106) aggregate a first count associated with the one or more hidden objects (411) and a second count associated with the one or more visible objects (102A) for the each level from the one or more levels for determining the stock (108) in the pallet (101). For example, referring to FIG. 4L and FIG. 4M, the computing system (106) may determine the first count by aggregating the one or more hidden objects (411) present in each level of the stacking, (i.e. determining a count value of the square symbols in each level of the pallet (101)). Further, the computing system (106) may determine the second count by aggregating the one or more visible objects (102A) present in each level of the stacking, (i.e. determining a count value of the circle symbols in each level of the pallet (101)). Furthermore, the computing system (106) aggregates the first count and the second count to determine the stock (108) in the pallet (101). In one embodiment, the stock (108) is determined for a plurality of the pallets in the inventory (100). Further, the stock (108) associated with each of the one or more products is aggregated to determine the remaining quantity of the stock (108) associated with each of the one or more products in the inventory (100). Further, the stock (108) determined in the inventory (100) may be provided to the user.

In an embodiment, after determining the stock (108), the computing system (106), may compute an error tolerance associated with the pallet (101) based on the 3D location (402) of the SKU marker (103) and the reference location (407) of the SKU marker (103). The error tolerance is determined using one of a Euclidean distance technique, Manhattan distance technique, Hamming distance technique and the like. Further, the computing system (106) may compare the error tolerance with the predefined threshold value. The predefined threshold value may be provided by the user. The computing system (106), based on the threshold value may accept the determined stock (108) when the error tolerance is less than the predefined threshold value or reject the determined stock (108) when the error tolerance is greater than the predefined threshold value. In case of rejecting the determined stock (108), the computing system may provide a notification to the user. Further, the user may capture the plurality of images (105) again or determine the stock (108) manually.

The method of determining the stock (108) (108) in the inventory (100) includes estimating the 3D location (402) of the SKU marker (103) for the one or more visible objects (102A) and determining a stacking pattern (406) for each level on the pallet (101). Further, detecting the presence or the absence of the one or more undetected objects in the pallet (101) for determining the stock (108) in the inventory (100). The plurality of images (105) captured from one or more positions (401) reduces the errors in estimating the 3D location (402) of the SKU marker (103) and in turn in determining the stock (108). Further, the plurality of images (105) captured from one or more positions (401) enables determining stock (108) for pallets of different dimensions. The pose estimation techniques provide the 3D location (402) with an increased accuracy. The stacking pattern (406) determined for each level in the pallet reduces the miscounts and helps in accurate determination of the stock (108). The stacking pattern (406) for each level helps to identify the one or more hidden objects (411) and one or more removed objects (412) in each level with lesser time and resources. Furthermore, identifying one or more undetected visible objects reduces the miscounts and helps in accurate determination of the stock (108). Thereafter, detecting the one or more hidden objects (411) and one or more removed objects (412) for each level of reduces the miscounts and helps in accurate determination of the stock (108). In addition, the error tolerance helps the user to accept or reject the determined stock (108) and in turn evaluate the system performance.

Computer System

Figure 5:
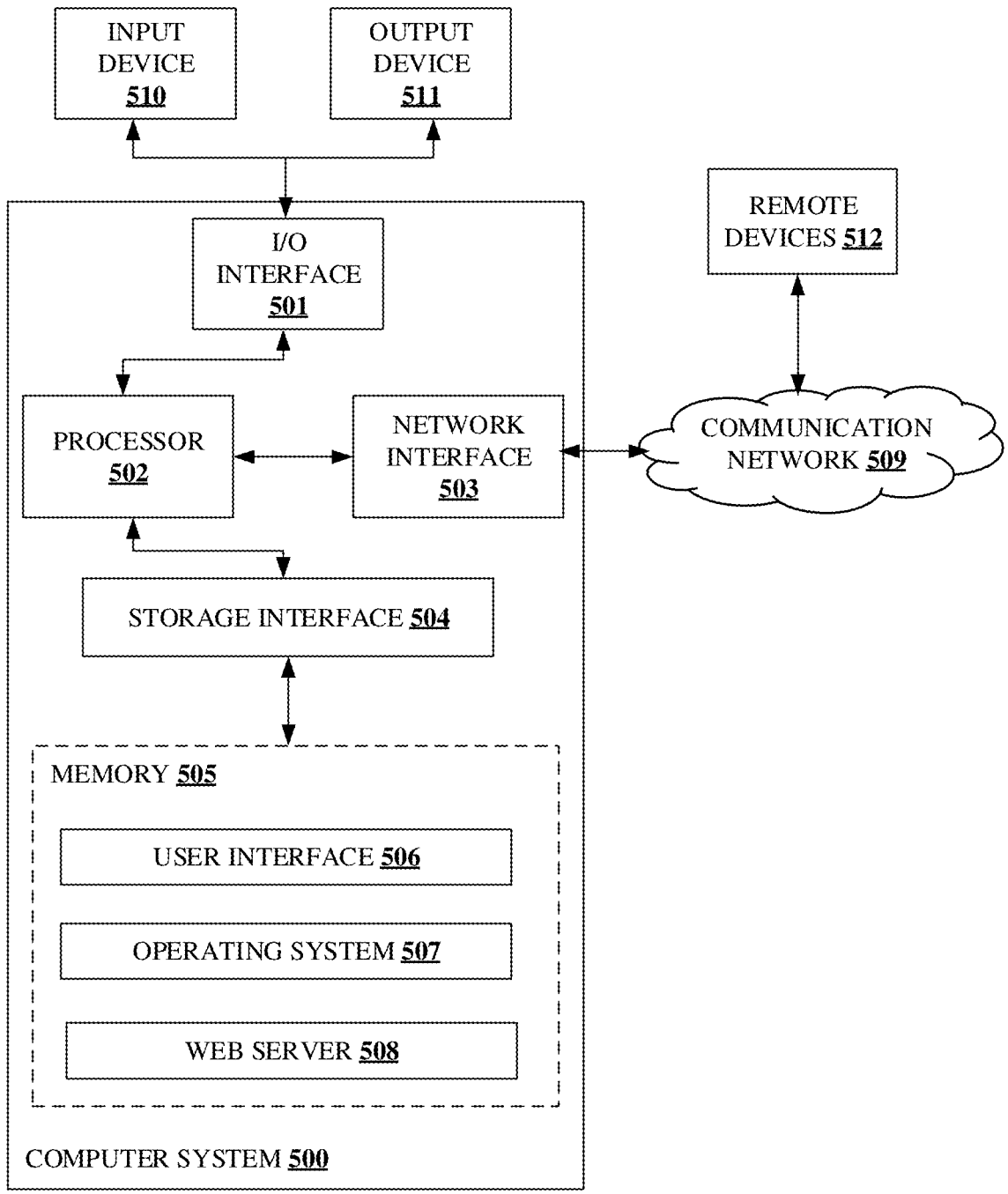
FIG. 5 shows an exemplary computer system for determining stock in an inventory, in accordance with some embodiments of the present disclosure.

FIG. 5 illustrates a block diagram of an exemplary computer system (500) for implementing embodiments consistent with the present disclosure. In an embodiment, the computer system (500) may be used to implement the method of determining stock (108) in an inventory (100). The computer system (500) may comprise a central processing unit ("CPU" or "processor") (502). The processor (502) may comprise at least one data processor for executing program components for dynamic resource allocation at run time. The processor (502) may include specialized processing units such as integrated system (bus) controllers, memory management control units, floating point units, graphics processing units, digital signal processing units, etc.

The processor (502) may be disposed in communication with one or more input/output (I/O) devices (not shown) via I/O interface (501). The I/O interface (501) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth®, cellular (e.g., code-division multiple access (CDMA), high-speed packet access (HSPA+), global system for mobile communications (GSM), long-term evolution (LTE), WiMax, or the like), etc.

Using the I/O interface (501), the computer system (500) may communicate with one or more I/O devices. For example, the input device (510) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (500) is connected to the service operator through a communication network (509). The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (509)

may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (503) and the communication network (509), the computer system (500) may communicate with the one or more service operators.

In some embodiments, the processor (502) may be disposed in communication with a memory (505) (e.g., RAM, ROM, etc. not shown in FIG. 5 via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, user interface (506), an operating system (507), web server (508) etc. In some embodiments, computer system (500) may store user/application data (506), such as the data, variables, records, etc. as described in this disclosure. Such databases may be implemented as fault-tolerant, relational, scalable, secure databases such as Oracle or Sybase.

The operating system (507) may facilitate resource management and operation of the computer system (500). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (500) may implement a web browser (not shown in the Figure) stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (508) may utilize facilities such as AJAX, HTML, ADOBE® FLASH®, JAVASCRIPT®, JAVA®, Application Programming Interfaces (APIs), etc. In some embodiments, the computer system (500) may implement a mail server stored program component not shown in the Figure). The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (500) may implement a mail client stored program component not shown in the Figure). The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium (103) refers to any type of physical memory on which information or data readable by a processor may be stored. Thus, a computer-readable storage medium (103) may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

In some implementation, the plurality of images (105), the stack pattern and the mapping table (410) may be received from the remote devices (512). In an embodiment, the remote devices (512) may be the image capturing device (104), and the storage medium (107).

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope being indicated by the following claims.

| REFERRAL NUMERALS: | |
|---|---|
| Reference number | Description |
| 100 | Inventory |
| 101 | Pallet |
| 102 | One or more objects |
| 102A | One or more visible objects |
| 103 | Stock Keep Unit (SKU) Marker |
| 104 | Image capturing device |
| 105 | Images |
| 106 | Computing system |
| 107 | Storage Medium |
| 108 | Stock |
| 201 | I/O interface |
| 202 | Memory |
| 203 | Processor |
| 204 | Data |
| 205 | Image data |
| 206 | Estimated location data |
| 207 | Stacking pattern data |
| 208 | Other data |
| 209 | Modules |
| 210 | Location module |
| 211 | Pattern detection module |
| 212 | Stock determination module |
| 213 | Input and output module |
| 214 | Other module |
| 401 | One or more positions |
| 402 | Three-dimensional (3D) location |
| 403 | Identification value |
| 404 | One or more details |
| 405 | Dimension |
| 406 | Stacking pattern |
| 407 | Reference location |
| 408 | Learning model |
| 409 | One or more reference patterns |
| 410 | Mapping table |
| 411 | One or more hidden objects |
| 412 | One or more removed objects |
| 500 | Computer System |
| 501 | I/O interface |
| 502 | Processor |
| 503 | Network Interface |
| 504 | Storage Interface |
| 505 | Memory |
| 506 | User Interface |
| 507 | Operating System |
| 508 | Web Server |
| 509 | Communication Network |
| 510 | Input Device |

-continued

| REFERRAL NUMERALS: | |
|---|---|
| Reference number | Description |
| 511 | Output Device |
| 512 | Remote Devices |

We claim:

1. A computing system for determining stock in an inventory, the computing system comprises:
   at least one processor; and
   a memory, wherein the memory is communicatively coupled to the at least one processor, wherein the memory stores instructions for the at least one processor, the instructions, upon execution by the at least one processor, cause the at least one processor to:
   obtain one or more images comprising one or more objects stored on a pallet in the inventory;
   estimate a three dimensional (3D) location of a Stock Keeping Unit (SKU) marker associated with each of one or more visible objects from the one or more objects in the one or more images, wherein the 3D location of the SKU marker is indicative of the 3D location of the associated visible object with respect to the pallet;
   determine a stacking pattern of the one or more objects for each level from one or more levels of stacking on the pallet using one of the 3D location of SKU marker and a learning model, by:
   obtaining one or more reference stacking patterns indicative of a reference location for the one or more objects in the pallet from the learning model based on the one or more images, wherein the learning model is pre-trained using Artificial Intelligence (AI) based learning techniques with one or more details associated with one or more objects;
   determining an aggregated error between the 3D location of the SKU marker associated with each of the one or more visible objects at each level and the reference location of the SKU marker; and
   selecting the stacking pattern for each level from the one or more levels of stacking in the pallet based on the aggregated error determined for the corresponding level;
   detect at least one of a presence or an absence of one or more undetected objects at each level based on the stacking pattern and the 3D location of the SKU marker associated with each of one or more visible objects at the each level of stacking; and
   determine the stock in the inventory based on the presence or the absence of the one or more undetected objects and the one or more visible objects from the one or more images.

2. The computing system as claimed in claim 1, wherein the processor is configured to obtain the one or more images comprises:
   receiving a plurality of images from a camera,
   wherein the computing system and the camera are connected using at least one of a wired interface and a wireless interface via a communication network;
   identifying one or more images which are blur-free and orthographic from the plurality of images; and
   retaining one or more regions of an image associated with the pallet in each of the one or more images.

3. The computing system as claimed in claim 2, wherein the processor is configured to estimate the 3D location of the SKU marker comprises:
   identifying the SKU marker associated with each of the one or more visible objects in each of the one or more images using computer vision techniques; and
   determining the 3D location of the SKU marker associated with each of the one or more visible objects from the one or more images using at least one of (i) a pose estimation technique and (ii) a geometry information of the camera,
   wherein the geometry information of the camera comprises at least one of focal length, principal point, and center of projection of the camera, and
   wherein the 3D location includes a distance in x-direction, a distance in y-direction and a distance in z-direction for the SKU marker in each of the one or more images.

4. The computing system as claimed in claim 1, wherein the processor is configured to determine the stacking pattern for the one or more objects at each level of stacking in the pallet using the SKU marker comprises:
   detecting an identification value in the SKU marker associated with the one or more visible objects;
   identifying one or more details associated with the one or more objects using the identification value, wherein the one or more details comprising at least a dimension of the one or more objects and the stacking pattern for each level stored in a storage medium; and
   obtaining the stacking pattern for the one or more objects corresponding to the each level from the one or more levels of stacking in the pallet from the storage medium.

5. The computing system as claimed in claim 1, wherein the processor is further configured to:
   identify a presence of one or more undetected visible objects in each of the one or more images, when the identification of the SKU marker associated with the one or more visible objects fails, based on a mapping table indicative of inter-dependency of the one or more visible objects placed on the pallet.

6. The computing system as claimed in claim 1, upon determining the stacking pattern, the processor is further configured to:
   obtain the reference location of the SKU marker using the stacking pattern;
   determine an error between the 3D location of the SKU marker and the reference location of the SKU marker for each of the one or more visible objects at the each level from the one or more levels in the one or more images; and
      refine the 3D location of the SKU marker associated with each of one or more visible objects at each level based on the stacking pattern and the error using at least one of proximity analysis, boundary position of the one or more objects, and an statistical analysis of the 3D location of the SKU marker and the reference location of the SKU marker.

7. The computing system as claimed in claim 1, wherein the processor is configured to detect one or more undetected objects comprising at least one of one or more hidden objects and one or more removed objects, comprises:
   applying a backward scanning technique to identify the one or more hidden objects in each level from the one or more levels based on the 3D location of the SKU marker in each level of stacking and the stacking pattern; and
   identifying the one or more removed objects in the each level from the one or more levels using the stacking pattern, the one or more hidden objects and the 3D location of the SKU marker using a forward scanning technique.

8. The computing system as claimed in claim 1, wherein the processor is configured to determine the stock based on the presence or the absence of the one or more undetected objects comprising at least one of one or more hidden objects and one or more removed objects from the one or more images comprises:
   aggregating a first count associated with the one or more hidden objects and a second count associated with the one or more visible objects for the each level from the one or more levels for determining the stock in the pallet;
   computing an error tolerance associated with the pallet based on the 3D location of the SKU marker and the reference location of the SKU marker; and
   comparing the error tolerance with a predefined threshold value and performing one of:
   accepting the determined stock when the error tolerance is less than the predefined threshold value; or
   rejecting the determined stock when the error tolerance is greater than the predefined threshold value.

9. A method of determining stock in an inventory, the method comprises:
   obtaining, by a computing system, one or more images comprising one or more objects stored on a pallet in the inventory;
   estimating, by the computing system, a three dimensional (3D) location of a Stock Keeping Unit (SKU) marker associated with each of one or more visible objects from the one or more objects in the one or more images, wherein the 3D location of the SKU marker is indicative of the 3D location of the associated visible object with respect to the pallet;
   determining, by the computing system, a stacking pattern of the one or more objects for each level from one or more levels of stacking on the pallet using one of the 3D location of SKU marker and a learning model, by:
   obtaining one or more reference stacking patterns indicative of a reference location for the one or more objects in the pallet from the learning model based on the one or more images, wherein the learning model is pre-trained using Artificial Intelligence (AI) based learning techniques with one or more details associated with one or more objects;
   determining an aggregated error between the 3D location of the SKU marker associated with each of the one or more visible objects at each level and the reference location of the SKU marker; and
   selecting the stacking pattern for each level from the one or more levels of stacking in the pallet based on the aggregated error determined for the corresponding level;
   detecting, by the computing system, at least one of a presence or an absence of one or more undetected objects at each level based on the stacking pattern and the 3D location of the SKU marker associated with each of one or more visible objects at the each level of stacking; and
   determining, by the computing system, the stock in the inventory based on the presence or the absence of the one or more undetected objects and the one or more visible objects from the one or more images.

10. The method as claimed in claim 9, wherein estimating the 3D location of the SKU marker comprises:
- identifying the SKU marker associated with each of the one or more visible objects in each of the one or more images using computer vision techniques; and
- determining the 3D location of the SKU marker associated with each of the one or more visible objects from the one or more images using at least one of a (i) pose estimation technique and (ii) a geometry information associated with a camera,
- wherein the geometry information of the camera comprises at least one of focal length, principal point, and center of projection of the camera, and
- wherein the 3D location includes a distance in x-direction, a distance in y-direction and a distance in z-direction for the SKU marker in each of the one or more images.

11. The method as claimed in claim 9, wherein determining the stacking pattern for the one or more objects at each level of stacking in the pallet using the SKU marker comprises:
- detecting an identification value in the SKU marker associated with the one or more visible objects;
- identifying one or more details associated with the one or more objects using the identification value, wherein the one or more details comprising at least a dimension of the one or more objects and the stacking pattern for each level stored in a storage medium; and
- obtaining the stacking pattern for the one or more objects corresponding to the each level from the one or more levels of stacking in the pallet from the storage medium.

12. The method as claimed in claim 9 further comprises:
- identifying a presence of one or more undetected visible objects in each of the one or more images, when the identification of the SKU marker associated with the one or more visible objects fails, based on a mapping table indicative of inter-dependency of the one or more visible objects placed on the pallet.

13. The method as claimed in claim 9, wherein detecting one or more undetected objects comprising at least one of one or more hidden objects and one or more removed objects, comprises:
- applying a backward scanning technique to identify the one or more hidden objects in each level from the one or more levels based on the 3D location of the SKU marker in each level of stacking and the stacking pattern; and
- identifying the one or more removed objects in the each level from the one or more levels using the stacking pattern, the one or more hidden objects and the 3D location of the SKU marker using a forward scanning technique.

14. The method as claimed in claim 9, wherein determining the stock based on the presence or the absence of the one or more undetected objects comprising at least one of one or more hidden objects and the one or more visible objects from the one or more images comprises:
- aggregating a first count associated with the one or more hidden objects and a second count associated with the one or more visible objects for the each level from the one or more levels for determining the stock of the pallet;
- computing an error tolerance associated with the pallet based on the 3D location of the SKU marker and the reference location of the SKU marker; and
- comparing the error tolerance with a predefined threshold value and performing one of:
  - accepting the determined stock when the error tolerance is less than the predefined threshold value; or
  - rejecting the determined stock when the error tolerance is greater than the predefined threshold value.

15. A non-transitory computer readable medium including instructions stored thereon that when processed by at least one processor cause a device to perform operations comprising:
- obtaining one or more images comprising one or more objects stored on a pallet in the inventory;
- estimating a three dimensional (3D) location of a Stock Keeping Unit (SKU) marker associated with each of one or more visible objects from the one or more objects in the one or more images, wherein the 3D location of the SKU marker is indicative of the 3D location of the associated visible object with respect to the pallet;
- determining a stacking pattern of the one or more objects for each level from one or more levels of stacking on the pallet using one of the 3D location of SKU marker and a learning model, by:
- obtaining one or more reference stacking patterns indicative of a reference location for the one or more objects in the pallet from the learning model based on the one or more images, wherein the learning model is pre-trained using Artificial Intelligence (AI) based learning techniques with one or more details associated with one or more objects;
- determining an aggregated error between the 3D location of the SKU marker associated with each of the one or more visible objects at each level and the reference location of the SKU marker; and
- selecting the staking pattern for each level from the one or more levels of stacking in the pallet based on the aggregated error determined for the corresponding level;
- detecting at least one of a presence or an absence of one or more undetected objects at each level based on the stacking pattern and the 3D location of the SKU marker associated with each of one or more visible objects at the each level of stacking; and
- determining the stock in the inventory based on the presence or the absence of the one or more undetected objects and the one or more visible objects from the one or more images.

16. The non-transitory computer readable medium of claim 15, wherein the instructions cause the processor to:
- obtain the reference location of the SKU marker using the stacking pattern;
- determine an error between the 3D location of the SKU marker and the reference location of the SKU marker for each of the one or more visible objects at the each level from the one or more levels in the one or more images; and
- refine the 3D location of the SKU marker associated with each of one or more visible objects at each level based on the stacking pattern and the error using at least one of proximity analysis, boundary position of the one or more objects, and an statistical analysis of the 3D location of the SKU marker and the reference location of the SKU marker.

17. The non-transitory computer readable medium of claim 15, wherein the instructions cause the processor to determine the stock based on the presence or the absence of the one or more undetected objects comprising at least one of one or more hidden objects and one or more removed objects from the one or more images comprises:

aggregating a first count associated with the one or more hidden objects and a second count associated with the one or more visible objects for the each level from the one or more levels for determining the stock in the pallet;

computing an error tolerance associated with the pallet based on the 3D location of the SKU marker and the reference location of the SKU marker; and comparing the error tolerance with a predefined threshold value and performing one of:

accepting the determined stock when the error tolerance is less than the predefined threshold value; or rejecting the determined stock when the error tolerance is greater than the predefined threshold value.

* * * * *